United States Patent
Rao

(10) Patent No.: US 11,947,946 B1
(45) Date of Patent: Apr. 2, 2024

(54) INTELLIGENT SOFTWARE DEVELOPMENT, SECURITY, AND OPERATIONS WORKFLOW

(71) Applicant: Synopsys, Inc., Mountain View, CA (US)

(72) Inventor: Meera Rao, Burtonsville, MD (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/387,832

(22) Filed: Jul. 28, 2021

Related U.S. Application Data

(60) Provisional application No. 63/059,471, filed on Jul. 31, 2020.

(51) Int. Cl.
*G06F 8/65* (2018.01)
*G06F 21/57* (2013.01)
*G06N 20/00* (2019.01)

(52) U.S. Cl.
CPC ............... *G06F 8/65* (2013.01); *G06F 21/57* (2013.01); *G06F 2221/033* (2013.01); *G06N 20/00* (2019.01)

(58) Field of Classification Search
CPC .......... G06F 8/60; G06F 8/65; G06F 11/3466
See application file for complete search history.

(56) References Cited

U.S. PATENT DOCUMENTS

| | | | |
|---|---|---|---|
| 10,866,872 B1* | 12/2020 | Gudka | G06F 11/3664 |
| 2012/0303772 A1* | 11/2012 | Ennis | H04L 41/00 709/223 |
| 2019/0205542 A1* | 7/2019 | Kao | G06F 8/10 |
| 2019/0250893 A1* | 8/2019 | Pandit | G06N 20/00 |
| 2020/0287793 A1* | 9/2020 | Buck | H04L 41/0806 |

* cited by examiner

*Primary Examiner* — Duy Khuong T Nguyen
(74) *Attorney, Agent, or Firm* — Lowenstein Sandler LLP

(57) ABSTRACT

Disclosed herein are system, computer-implemented method, and computer program product (computer-readable storage medium) embodiments for implementing an intelligent DevSecOps workflow. An embodiment includes receiving, by at least one processor, a risk profile associated with a software deployment, and an update related to the software deployment; and evaluating, by the at least one processor, at least one parameter associated with the update, to produce an evaluation result. Additionally, the at least one processor may determine a set of actions in response to the update, based at least in part on the evaluation result, an application dataset corresponding to the software deployment, and a group of specified criteria on which the risk profile is based; or perform at least one action of the set of actions in response to the update, according to some example use cases.

20 Claims, 23 Drawing Sheets

What would a solution look like?

| Governance | Transparent | Feedback loop | Auditability | Human Element | Flexibility |
|---|---|---|---|---|---|
| Rules enforce themselves ("governance as code") | Complexity of the pipeline may be reduced, including tools, config, output | Quick and continuous feedback | Consistent results with audit trails | Limited manual intervention | Changes to configuration, tools, input and output format for all existing controls |

FIG. 2

| Abstraction | Extensibility | Intelligence | Adoption (Time) |
|---|---|---|---|
| Pipeline abstracts the tool complexity. | Integrate new back-end scanners or front-end reporting tools. | Security activities automatically triggered in real time based on policy, risk threshold, and code-change impact. | Code to connect to your existing pipelines. |
| Comes complete with native SAST, SCA, and IAST capabilities. | As applications grow, storage, RAM, and CPU(s) may be added as needed. | | On-boarding new and existing applications takes less than an hour, in some cases, minutes, for similar technologies. |
| Pipeline fully managed by managed-services staff. | | | |

Security Activities | Risk Score Card | TPI Data | Application Manifest | Security Manifest

[Internet/15.0] Accessibility Score

[Low/4.0] Change Significance Score

[High/11.25] Open Vulnerability Score

[56.5] Total Score

[Critical/15.0] Business Criticality Score

[Restricted/11.25] Data Classification Score

[0.0] Security Tooling Score

REFERENCE RISK MATRIX

| Lower Range Limit | Upper Range Limit | SCA | SAST + M | SAST | DAST + M | DAST | IMAGESCAN |
|---|---|---|---|---|---|---|---|
| 0 | 40 | ☐ | ☐ | ☐ | ☐ | ☐ | ☐ |
| 40 | 55 | ☑ | ☐ | ☑ | ☐ | ☐ | ☐ |
| 55 | 70 | ☑ | ☐ | ☑ | ☐ | ☐ | ☑ |
| 70 | 85 | ☑ | ☐ | ☑ | ☐ | ☑ | ☑ |
| 85 | 100 | ☑ | ☑ | ☑ | ☑ | ☑ | ☑ |

Legacy Development Assessments Table

| Score | | TM | Controls | SCA | Code Review | | Penetration Testing | |
|---|---|---|---|---|---|---|---|---|
| Score Low | Score High | | | SCA | SAST | SAST+M | DAST | DAST+M |
| 0 | 40 | No | No | No | No | No | No | No |
| 41 | 55 | No | No | Yes | Yes | No | No | No |
| 56 | 70 | No | No | Yes | Yes | No | Yes | No |
| 71 | 85 | No | Yes | Yes | No | Yes | Yes | No |
| 86 | 100 | Yes | No | Yes | No | Yes | No | Yes |

CICD Assessments Table

| Score | | TM | Controls | SCA | Code Review | | Penetration Testing | |
|---|---|---|---|---|---|---|---|---|
| Score Low | Score High | | | SCA | SAST | SAST+M | DAST | DAST+M |
| 0 | 40 | No | No | Yes | Yes | No | Yes | No |
| 41 | 55 | No | No | Yes | Yes | No | Yes | No |
| 56 | 70 | No | No | Yes | Yes | Yes | Yes | No |
| 71 | 85 | No | Yes | Yes | Yes | Yes | Yes | No |
| 86 | 100 | Yes | No | Yes | Yes | Yes | Yes | Yes |

FIG. 19

| | Question | Response |
|---|---|---|
| | VTA Type | Periodic |
| | Business/Mission Critical | Medium |
| | Data Classification | Internal |
| | Accessibility | Internet |
| | Regulatory Requirements | IndFin |
| | Open Vulnerabilities | Medium |
| | SDLC Type | EDM |
| | Change Significance | Medium |
| | Training | Champion |
| Date of Last: | SAST | 1-1-2020 |
| | DAST | 1-2-2020 |
| | SCA | 1-3-2020 |
| | ARCH | 1-4-2020 |
| SSDLC Tooling | SecureAssist | TRUE |
| | SCA | TRUE |
| | SAST | FALSE |
| | IAST | FALSE |
| | RASP | FALSE |

| "Business/Mission Critical" Application Classificaiton (VTA) | | | |
|---|---|---|---|
| Criticality | Points | Qualifier | Estimated Count |
| Critical | 100 | Financial & PPI | 25 |
| High | 75 | Financial | PPI | 100 |
| Medium | 25 | DMZ | 200 |
| Low | 10 | Other | 500 |

| Suggested Data Classification | | |
|---|---|---|
| Highly Restricted | 100 | Financial | PPI | > 100K records |
| Restricted | 75 | Financial | PPI |
| Internal | 25 | Sensitive, but not Financial | PPI |
| Public | 10 | Made available to public and intended for distribution |

| Accessibility | | |
|---|---|---|
| Physical | 10 | Application can only be accessed at a physical site |
| Intranet | 25 | Internal Staff only can access |
| Partner | 75 | Corporate partners and internal staff can access |
| Internet | 100 | Application is available to the internet |

| Regulatory Requirements | | |
|---|---|---|
| IndFin | 100 | Industry (FHFA, FFIEC, etc.) and Financial (PCI, SOX, etc.) |
| Financial | 75 | Financial |
| Industry | 25 | Industry |
| None | 0 | None |

| Open Vulnerabilities | | |
|---|---|---|
| Critical | 100 | Open criticals |
| High | 75 | Open highs |
| Medium | 25 | Open mediums |
| Low | 10 | Open lows |

| SSLDC Tooling | | |
|---|---|---|
| RASP | 20 | Integrated RASP w/ runtime in blocker mode |
| SecureAssist | 20 | Integrated SecureAssist w/ IDE |
| IAST | 20 | Integrated IAST w/ QA |
| SCA | 20 | Integrated SCA w/ Build |
| SAST | 20 | Integrated SAST w/ Build |

| Scoring Table | |
|---|---|
| Data | Points Share |
| Business/Mission Critical | 10% |
| Data Classification | 15% |
| Accessibility | 15% |
| Open Vulnerabilities | 10% |
| SSDLC Tooling | 10% |
| Change Significance | 40% |
| Training | 0% |
| Total: | 100% |

FIG. 21

| SDLC Type | | |
|---|---|---|
| Agile | N/A | Agile methodology |
| Waterfall | N/A | Waterfall Methodology |

| Change Significance | | |
|---|---|---|
| Critical | 100 | Significant change in sensitive application functionality (Authentication/Authorization/Encyption/etc.) |
| High | 75 | Significant change in non-sensitive application functionality or minor change in sensitive application functionality |
| Medium | 25 | Minor change in non-sensitive application functionality |
| Low | 10 | Insignificant "break-fix" change |

| Historical Testing | | |
|---|---|---|
| SAST | N/A | Last date of SAST or Secure Code Review |
| DAST | N/A | Last date of DAST or Penetration Testing |
| Architecture | N/A | Last date of secure architecure review |
| SCA | N/A | Last date of SCA |

| Penetration Type | | |
|---|---|---|
| Periodic | N/A | PT scheduled on cadence due to risk level |
| Project | N/A | PT required as part of project process |

| Training | | |
|---|---|---|
| Champion | 0 | Team meets minimum training requirements and has an Application Security Champion |
| Sufficient | 25 | Team meets minimum training requirements |
| Deficient | 100 | Team does not meet minimum training requirements |

| Boolean |
|---|
| TRUE |
| FALSE |

FIG. 22

INTELLIGENT SOFTWARE DEVELOPMENT, SECURITY, AND OPERATIONS WORKFLOW

BACKGROUND

Management of modern software deployments and development pipelines has grown increasingly complex. Software deployments may include dozens to thousands or more constituent components. Monitoring deployments and development pipelines for potential issues affecting robustness and security may require consideration of numerous different data and other factors, any of which may include different ranges of values and near limitless range of permutations. Due to this complexity, conventional automation of software development lifecycle management by way of preprogrammed logic or decision trees may be inadequate for maintaining secure, high-availability software deployments for modern applications, or corresponding development pipelines or workflows.

TECHNICAL FIELD

The present disclosure relates generally to enhanced tooling around software development and operations, and more specifically, continuous integration, testing, deployment, and delivery, with an orientation toward security.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2 depicts an example list of considerations for an intelligent DevSecOps workflow, according to some embodiments of the present disclosure.

FIG. 3 depicts an example table of further aspects of an intelligent DevSecOps workflow, according to some embodiments of the present disclosure.

FIG. 9 depicts an example risk score card and risk profile including risk-based criteria used for determining further actions, according to some embodiments of the present disclosure.

FIG. 19 depicts an example of risk-based criteria for determining further actions based on certain criteria, according to some embodiments of the present disclosure.

FIG. 20 depicts an example of risk-based criteria with respect to secure software development lifecycle (SSDLC) tooling within an intelligent DevSecOps workflow, according to some embodiments of the present disclosure.

FIG. 21 depicts a further example of risk-based criteria with respect to SSDLC tooling within an intelligent DevSecOps workflow, according to some embodiments of the present disclosure.

FIG. 22 depicts a further example of risk-based criteria with respect to SSDLC tooling within an intelligent DevSecOps workflow, according to some embodiments of the present disclosure.

DETAILED DESCRIPTION

Figure 1:
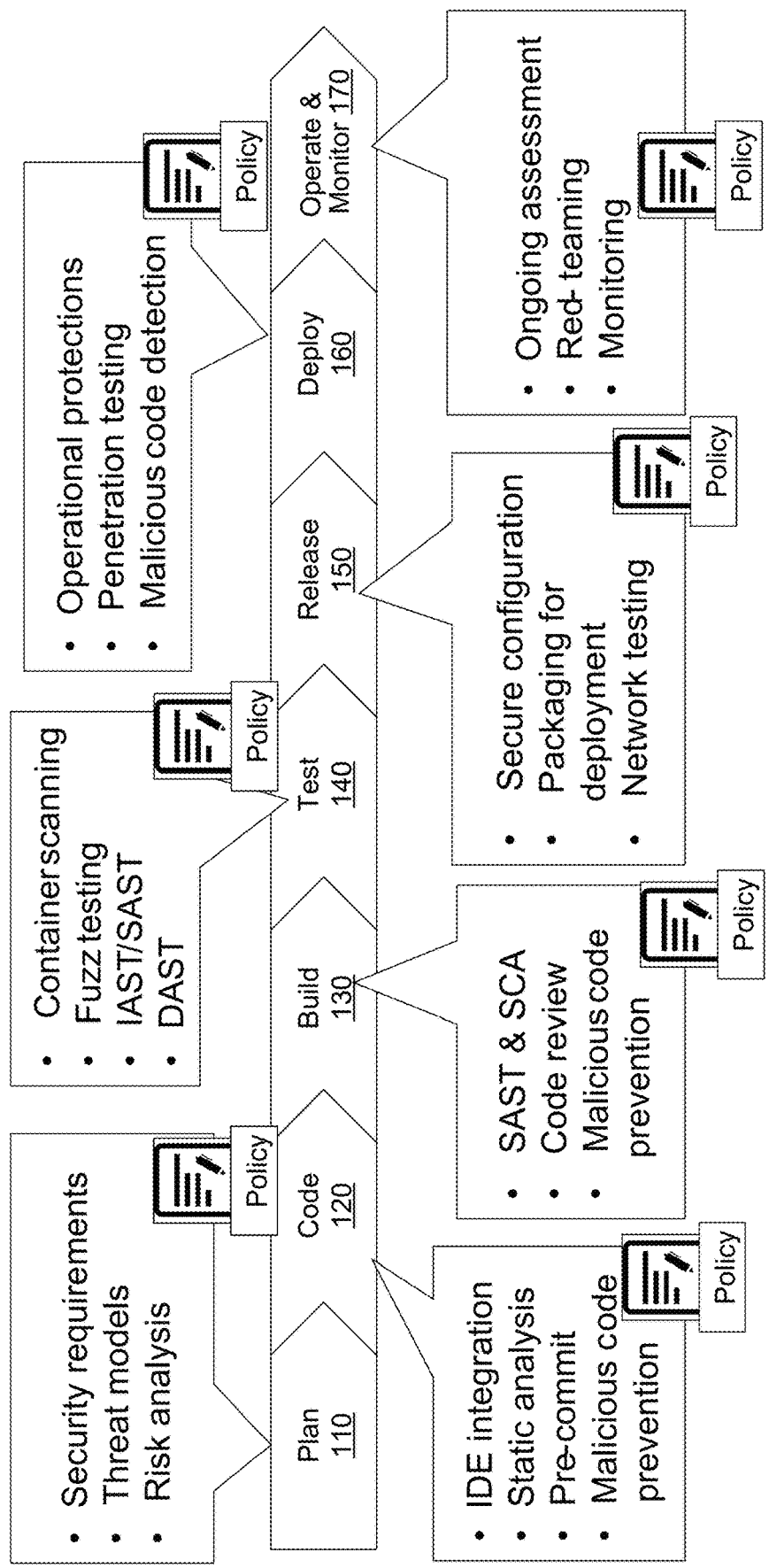
FIG. 1 depicts an example of a policy-driven DevSecOps pipeline, according to some embodiments of the present disclosure.

Some aspects of the present disclosure relate to an intelligent software development, security, and operations (DevSecOps) workflow. Additionally, or alternatively, aspects of the present disclosure may relate to other aspects of DevOps or software-development life cycle (SDLC) management with an orientation to security, robustness, efficiency, or a combination thereof.

Complexity of modern software deployments, combined with requirements for maintaining high availability throughout updates and security threats, may impose considerable burdens and resource drains on teams that develop, administer, and manage these software deployments, for example, using various workflows within a DevSecOps architecture or pipeline. Such liabilities increase with the size and number of components that constitute the software deployments.

Intelligence (IQ) tools built into a given pipeline or workflow for DevSecOps or SDLC management may include enhanced technological tools capable of working independently of each other, or together in various combinations, to help an organization or software project transform a continuous integration (CI)/continuous deployment or continuous delivery (CD) pipeline into a more tightly integrated and automated DevSecOps pipeline. Built-in IQ may provide intelligence to enable a pipeline to become completely automated and provide continuous feedback, continuous learning, continuous measurement, and continuous compliance. These tools are described in further detail herein.

To allow enhanced technological tools to achieve these goals for a given deployment, an associated risk profile and an update may be received as input for at least one of the tools, which may evaluate some parameter(s) associated with the update to produce an evaluation result. In response to the update, at least one tool may automatically determine a set of actions to be taken in response to the update, based at least in part on the evaluation result, a group of specified criteria on which the risk profile is based, and a component manifest corresponding to the software deployment. At least one action of the set may be performed by the tool(s), for example.

Criteria may be specified in accordance with aspects of the give deployment and risk factors associated with the deployment and affected parties. In this way, built-in IQ tools in a DevSecOps pipeline may automatically and quickly determine appropriate actions in complex scenarios that may otherwise require interactive decision making among large teams of individual managers, administrators, and developers, slowing overall reaction time and potentially introducing inconsistent actions that may elevate risk beyond acceptable levels.

Artificial intelligence, including machine learning or other related techniques, processes, or algorithms, may be further integrated into a given DevSecOps pipeline or similar workflow, to collect additional data or to refine the results of the enhanced techniques described herein. In so doing, built-in IQ tools such as those described herein may thereby achieve accuracy and efficiency of SDLC management and DevSecOps workflow not otherwise achievable by manual techniques or conventional automation. Other technical advantages are also apparent from the description and drawings throughout this disclosure.

FIG. 1 depicts an example of a policy-driven DevSecOps pipeline 100, according to some embodiments of the present disclosure. This model of DevSecOps pipeline 100 accounts for multiple activities for creating, testing, and deploying modern applications. Moreover, any stage or combination of stages in DevSecOps pipeline 100 may be looped or fed back into another stage at any time in the SDLC, allowing for continuous feedback and enhanced efficiency in secure maintenance of deployed software over time.

Each stage of the pipeline (e.g., plan 110, code 120, build 130, test 140, release 150, deploy 160, operate and monitor 170, to name a few non-limiting examples in the embodiment shown) may implement its own independent policy, which may include conditions or criteria that may unique to the given stage, or shared in common with certain other stages of DevSecOps pipeline 100. Elements of a given policy may be conditioned upon specific components of the software deployment, such as may be present in an inventory of applications or components (e.g., libraries, application dependencies, third-party services, or the like). Applications or components of a software deployment may be tracked via databases and/or data structures such as a component manifest or application-inventory database, configuration-management database (CMDB), local or remote repository, etc.

A policy may be defined based at least in part on risk-based criteria, which may be determined in advance such as by configurations specified by an organization or a particular user (e.g., engineer, developer, manager), and/or which may be processed via one or more algorithms or processes, including those based on any number of heuristics, machine learning models, or other artificial intelligence, in some embodiments. Thereby, potential actions may be determined with respect to one or more applications or components of the software deployment, stages of the DevSecOps pipeline 100, or predetermined actions outside the scope of the deployment or DevSecOps pipeline 100 (out-of-band activities).

Any such actions or activities may be presented for manual selection and/or triggered automatically as a result of the processing performed as part of such a policy-driven DevSecOps pipeline 100. Some of these actions may involve pausing or breaking a software build, or reverting or offlining a given operational software deployment, in order to preserve a level of security (maintaining a level of risk) within parameters effectively defined by a given risk profile based on predetermined criteria, in some particular use cases, for example.

FIG. 2 depicts an example list of considerations 200 for an intelligent DevSecOps workflow, according to some embodiments of the present disclosure. FIG. 3 depicts an example table of further aspects 300 of an intelligent DevSecOps workflow, according to some embodiments of the present disclosure. By way of this non-limiting example multiple considerations 200 and further aspects 300 relating to an intelligent DevSecOps workflow, it can be seen how an organization or particular user may set policies and architect a given policy-driven DevSecOps pipeline 100, such as that shown in FIG. 1, for some use cases.

Figure 4:
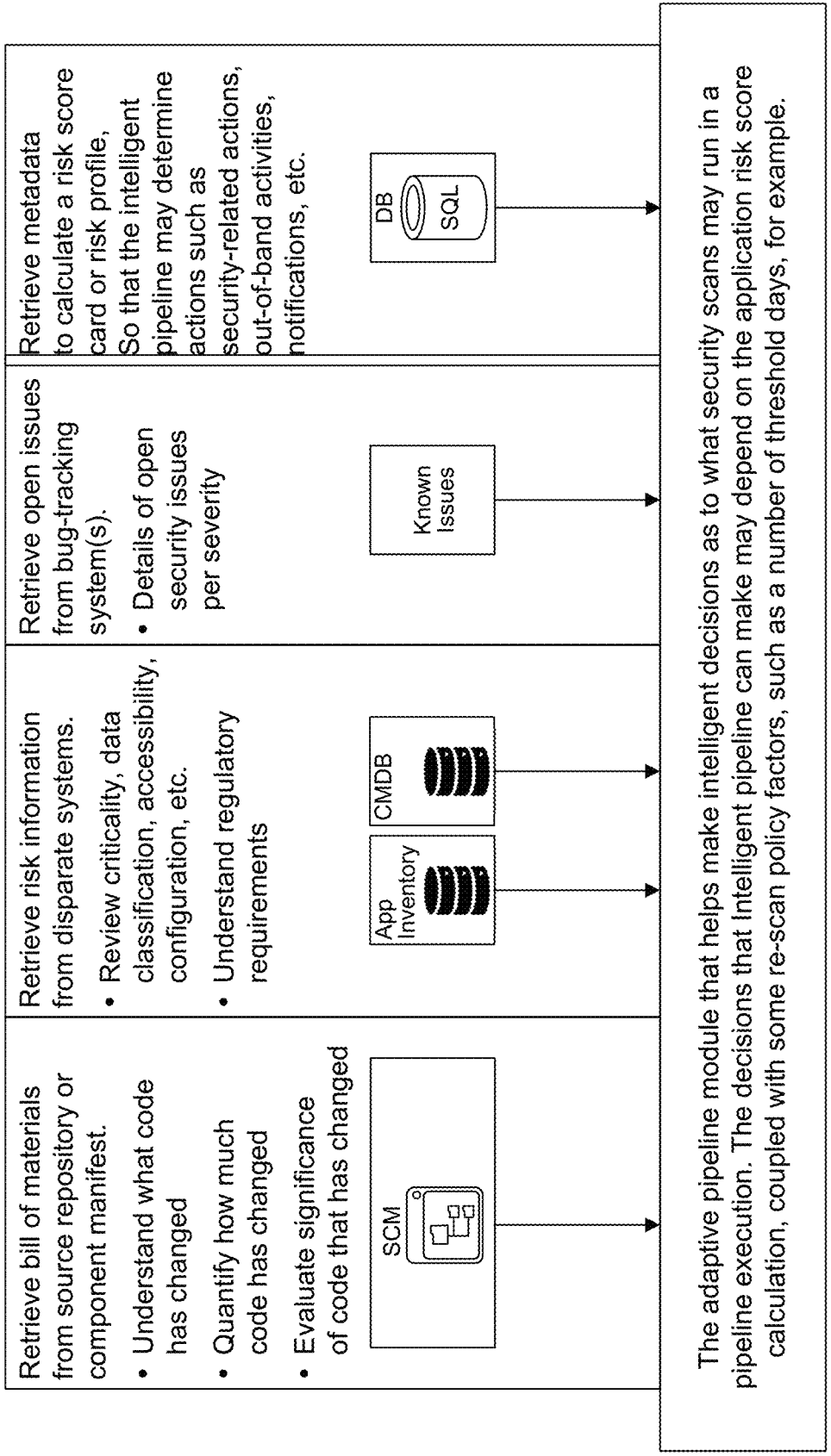
FIG. 4 depicts an example of an adaptive pipeline module in a DevSecOps pipeline, according to some embodiments of the present disclosure.

FIG. 4 depicts an example of an adaptive pipeline module 400 in a DevSecOps pipeline, such as the policy-driven DevSecOps pipeline 100 of FIG. 1, according to some embodiments of the present disclosure. The adaptive pipeline module 400 shows an example overview of a module in a pipeline implementing some or all of the enhanced techniques disclosed herein. Any number or complexity of inputs may be provided, such as source code, components, applications, libraries, dependencies, known issues (e.g., bugs, weaknesses, reported vulnerabilities); may be provided together with a calculated risk score card or risk profile generated from predetermined criteria as described elsewhere herein.

Based on these inputs to a policy-driven DevSecOps pipeline 100 that may include an intelligent risk-based engine with at least one adaptive pipeline module 400, and as a result of implementing the enhanced technology described further elsewhere herein, an intelligent DevSecOps workflow may be efficiently scaled to handle security-related issues safely and transparently for large-scale software deployments, even when their complexity grows beyond the scalability or capability of a team of any number of engineers, developers, or managers. As part of achieving such goals, example elements of FIGS. 1-4, and other technology described herein, are described further below.

Risk Based Adaptive Pipeline Tool

A risk-based adaptive pipeline tool may include a custom-built and/or fully automated, risk-based engine, which may intake any procedural, application, and system information from any of various software development and/or deployment or infrastructure systems to make real-time security decisions in a DevSecOps pipeline.

In some embodiments of the present disclosure, data intake and output activities may include receiving and/or processing JavaScript Object Notation (JSON) or YAML (a human-readable data-serialization language) files which may contain projects, applications and system data for consumption by a risk-based adaptive pipeline, for example. Intake streams may originate from any source-code repository or version-control tool(s), e.g., Subversion, Mercurial, Bitbucket, Git, and other Git-based tools/platforms, further including any extensions, issue trackers, request trackers, audit trackers, vulnerability trackers, CI, etc.

Building adapters with a desired system may include interfaces/gateways to other protocols, e.g., for notification via e-mail, instant messaging, social media, voice, and text-messaging services via various telephone networks, to security-assurance teams for out-of-band activities. Building adapters with CI and/or orchestration tools, including configuration management, infrastructure management tools, further including orchestration tools for containers, virtual machines, and/or hypervisors. A non-exhaustive list of such tools in an example pipeline may include, but is not limited to, GitLab CI, Jenkins, Kubernetes, Rancher Harvester, xcp-ng, OKD, KubeVirt, or the like), separately from or together with tools for configuration management or infrastructure-as-code solutions (e.g., Ansible, SaltStack, Chef, Puppet, Terraform, or the like) for software-development life cycle (SDLC) may further include triggers based on various types of security-related activity, for example.

Intelligence activities may include creating a rules engine to select out-of-band security-related activities at project instantiation and through continuous feedback during SDLC; select SDLC in-line pipeline security activities at project instantiation and through continuous feedback during SDLC; build a rules engine in a way that may allow for customization via properties file, rather than development and rebuild; and/or create hooks for the SCT (scan confidence tool, as described further below) for services based on properties input file, according to an example embodiment of the present disclosure.

Scan Confidence Tool (SCT)

SCT may help organizations or projects mature their DevSecOps practices and/or processes. Additionally, or alternatively, SCT may transform secure CI/CD pipelines to DevSecOps pipelines.

SDLC Gates

SDLC gates may be used to provide security and quality tool-based enforcement to a unified gating/enforcement framework within a CI/CD pipeline. Security gates and/or quality gates may be enforced within specific tools. For some use cases, the gating process may be rigid and dependent on the tool being used. However, SCT may be used to smooth out the gating process and enforce within a CI/CD pipeline itself, thus removing tool dependency and ensuring customizable gates and scan results handling, according to some example embodiments.

Modules

SCT may be a customized tool that is tailored to specific requirements. The functionality of the SCT may include a scan health checker, a build breaker, a bug tracker, a metrics dashboard, an out-of-band activity handler, and a notifications engine (notifications module), to name a few non-limiting examples.

A scan health checker module may confirm reliability and accuracy of a scan by checking certain conditions. The conditions may be developed as per organizational standards and tools used to scan the application. The scan health checker may also help with build viability to decide whether a scan is a good scan, in some use cases.

A build breaker module may be configured such that, when a scan that indicates a new vulnerability or weakness is deemed as a good scan, an organization may choose to pause or break the build. The highly configurable breaking criteria may be defined in one or more input files such as criteria files, for example.

A bug tracker module may be used to create and update tickets on a common bug-tracking system in an automated manner, according to some embodiments.

A metrics dashboard module may be used to scan results to a single dashboard for mining and metrics calculations and normalization, to name a few non-limiting examples.

Out-of-band activity handler module may be configured such that, when a security gate or a quality gate fails, a user may be presented with selection option(s) to trigger out-of-band activities, such as manual code review or penetration testing, from within a CI/CD pipeline itself.

A notifications module may be used to help notify stakeholders or other concerned persons, via chat, e-mail, online portal, etc., in cases when certain conditions are satisfied. Example conditions may be a scan pass or failure, and an out-of-band activity trigger.

Depending on client requirements, workflows may be designed, and modules customized and implemented in a client environment.

Supported Tools

The SCT may be tool-agnostic, and may work on any quality-assurance tool and/or security tool if the given tool is suitable for a targeted CI/CD usage. Tool adapters may be created to transform the security and quality tool output data into a normalized SCT data format. This normalized SCT format may be used to invoke SCT modules.

Code

SCT may be developed in any programming or scripting language, e.g., C, Java, and/or Python, though other programming languages may potentially be used, alone or in combination. Code may reside in a separate source-code management (SCM) system (e.g., per standard or custom tools for version control, distribution, or other repositories) or alongside application code. The same criteria files may be used for enforcement in an entire organization, or different teams and projects may have their own enforcement criteria.

Policy, standards and controls may be typically falling behind current development practices. An automated solution that keeps up with modern development velocity and still meets compliance obligations may provide advantages. Examples of such a solution are detailed below.

Example Solution

A purpose-built, intelligent, cloud-enabled CI/CD pipeline, inclusive of native software security scanning, may empower DevOps teams or DevSecOps teams to produce secure software faster, according to some embodiments. Such solutions may address typical problems with conventional DevOps pipelines, such as those in which software security is viewed as an impediment to DevOps.

Thus, in some embodiments, solutions may include tools via a uniform pipeline, reducing time to implement tools, reducing pipeline friction, reducing dedicated staff required to manage specific tool sets, and/or providing more uniformity in providing continuous feedback, for example. Still, in adding security to a DevOps pipeline (e.g., upgrading to DevSecOps), security tools may be designed to find more potential issues, thus competing with the DevOps mindset of "fail fast." Thus, in a conventional approach, scaling may still be a challenge. To achieve at least the above-mentioned goals of an intelligent pipeline, additional examples of an enhanced approach are described further below and elsewhere herein.

Enhanced Approach

A holistic intelligent solution combining people, process, and technologies may be customized to meet DevSecOps challenges and security needs around a given software deployment.

Example 1

Policies change. In an example scenario, a new organization-wide policy may have been defined that requires daily static application security testing (SAST) scans and weekly interactive application security testing (IAST) scans.

An example problem with conventional technology may be that after many e-mails, phone calls, meetings, and escalations (and potentially months of waiting), only a portion of projects may be in compliance with the new policy.

In an embodiment of the present disclosure, an e-mail may be received indicating a new policy requirement at, for example, 11:00 am. With an example enhanced approach, the DevSecOps team may make the necessary configuration updates to become compliant within a day rather than within months.

Additional examples are provided further below, illustrating concepts outlined in Table 1 and depicted in the drawings submitted herewith. These embodiments serve as illustrative examples and are not to be construed as limiting the scope of this disclosure.

Example 2

A slight change in compliance or code should not cause unnecessary work. In an example scenario, a small change in source code may be made for an application. The application security team may then require full dynamic application security testing (DAST), SAST, and IAST scans to be completed and results reviewed before the application can be deployed to production. However, the functional testing has already been completed, so the application should be ready for deployment.

Another example of problems with conventional technology is that SAST, DAST, and IAST may cause significant delay with manual review in traditional workflows before the results are finally reviewed and deployed to production. Using the methods of the present disclosure, the risk-based configuration settings may be defined and may be automatically determined to indicate that a full SAST scan may not be necessary. Instead, a quick incremental SAST scan may be completed. DAST and IAST may also be skipped, for some use cases.

Example 3

In an example scenario, a competitor hack may point out the latest vulnerability in an operating system (OS) package. Measures may be taken to identify impacted projects and remediate any risk.

Another example problem with conventional technology may be that after many e-mails, phone calls, meetings and escalations (and weeks to months), only a portion of projects may be in compliance with the new policy.

To work around this problem, extra application security scanning requirements may be quickly configured for software composition analysis (SCA), SAST, and DAST on all applications that have that component. Build breaks may also be set up to prevent the release of any new code with that vulnerability and/or that component version. This reconfiguration may be done in a day for all applications in the workflow.

TABLE 1

Related Components

| Module | Description |
|---|---|
| Built-In Intelligence (IQ) | Implements Governance-as-Code. Fully automated, configurable, risk-based engine that intakes procedural, application, and system information from various systems to make real-time, intelligent security decisions. |
| Workflow Engine (Scan Confidence Tool) | Data normalization and workflow. Convert reports extracted from security tools into a uniform schema. Automatically create issue tickets, e.g., in Jira or similar bug tracker, for tracking. Match the build-breaking criteria and provide scan feedback, for example, as an in-platform notification (e.g., instant messaging or business-communication platform), e-mail, unstable build marker, breaking a build). SCT also feeds the Defect Density Plugin. |
| Insights | Provides customers with insights into their organization or software portfolio. Defect-density tracking. Groups that could benefit from specific training. Real-time training recommendations for development staff. Identification of new tech stacks being utilized. |
| Orchestration Engine | Specifies how security tools are integrated and are configured to run scans. Users can configure application-specific details that enhanced pipelines use to run SAST, SCA, and/or IAST tools underneath. |

The adaptive pipeline module 400 may be configured to help make intelligent decisions as to what security scans may run in a pipeline execution. The decisions that this adaptive pipeline module 400 (also referred to as built-in intelligence or IQ, as described elsewhere herein) can make in a given deployment scenario may depend on a risk profile and/or an application risk score calculation, in some embodiments, and may be coupled with re-scan policy factors such as a number of threshold days, in some example use cases.

Example Architecture

Figure 5:
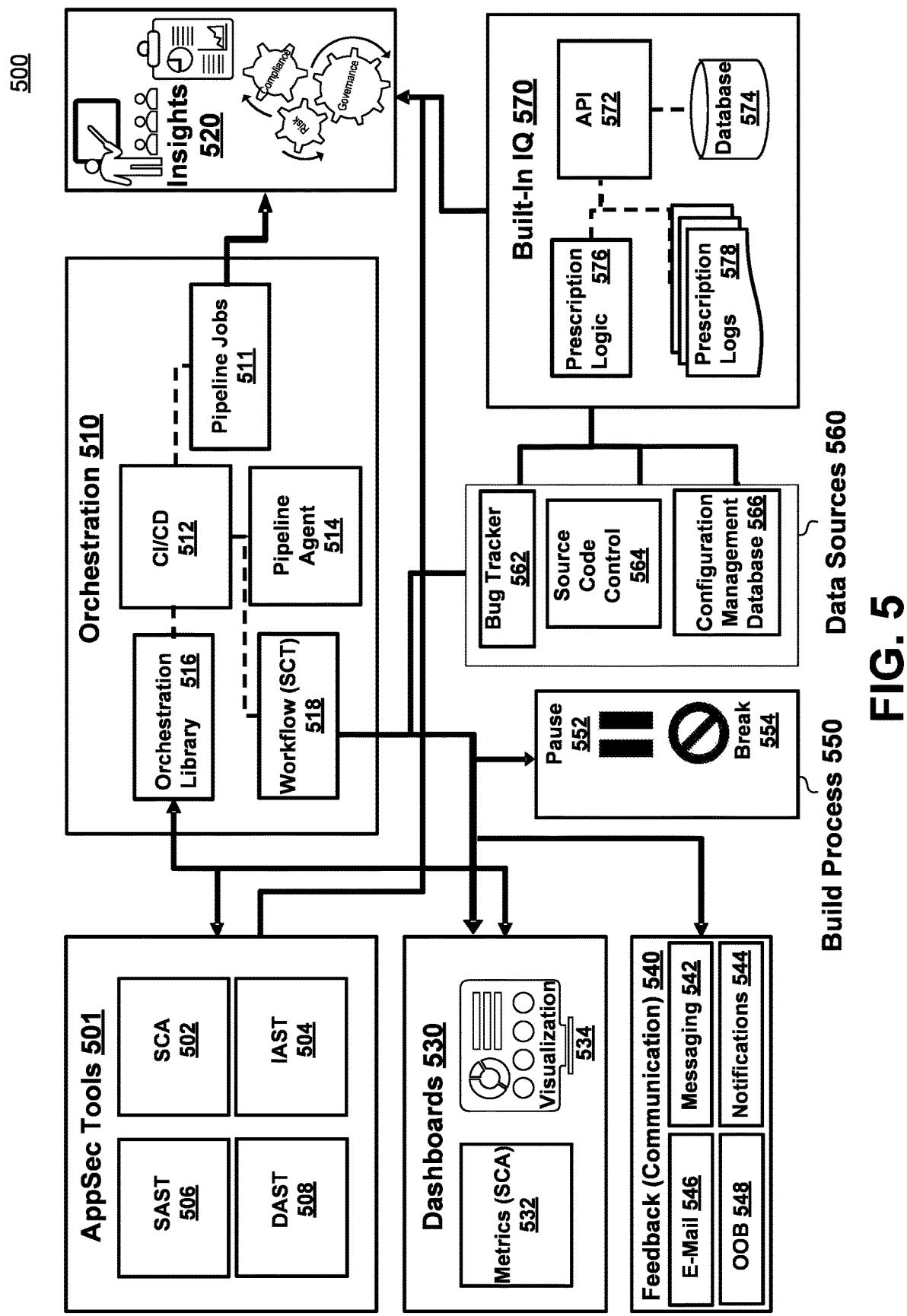
FIG. 5 depicts an example intelligent DevSecOps architecture, according to some embodiments of the present disclosure.

FIG. 5 depicts an example intelligent DevSecOps architecture 500, according to some embodiments of the present disclosure. For purposes of the block diagram shown in FIG. 5, any block or division within DevSecOps architecture 500 may represent one or more modules of hardware and/or software in one or more computer systems or services implementing one or more tools or stages of an intelligent DevSecOps pipeline 100 or corresponding workflow, for some example use cases.

In an embodiment, DevSecOps architecture 500 may be organized in higher-level modules including application security (AppSec) tools 501, orchestration 510, insights 520, dashboards 530, feedback (communication) 540, build process 550, data sources 560, and built-in IQ 570 (e.g., adaptive pipeline module 400 above), among other possible modules.

The example organization and interconnections shown in FIG. 5 are intended only to be illustrative and not limiting—other embodiments may have a different arrangement or hierarchy of modules, and any particular module may be configured at particular stages of a DevSecOps pipeline to communicate with or exert control over another designated module. For example, an orchestration 510 module or submodule thereof may be configured to exert control over the build process 550 module, as well as AppSec tools 501, insights 520, dashboards 530, and/or feedback 540, for example.

AppSec tools 501 may further include modules or submodules such as SCA 502, IAST 504, SAST 506, DAST 508, or other modules or submodules relating to application security, for example. Functionality and objectives of SCA 502, IAST 504, SAST 506, and DAST 508, may include those of SCA, IAST, SAST, and DAST, respectively, as described elsewhere herein.

AppSec tools 501 may be configured to communicate, control, or otherwise interact with orchestration 510. As with orchestration 510, AppSec tools 501 may be configured to communicate, control, or otherwise interact with other higher- or lower-level modules or submodules within DevSecOps architecture 500, including insights 520, dashboards 530, feedback 540, build process 550, or data sources 560, according to some example embodiments.

Orchestration 510 may further include modules or submodules such as pipeline jobs 511, CI/CD 512, pipeline agent 514, orchestration library 516, workflow 518 (e.g., including SCT), or other modules or submodules relating to orchestration, for example. Functionality and objectives of orchestration 510 and any other corresponding modules or submodules may be correspond to that of adapters with CI, configuration management, infrastructure management tools, or other orchestration tools such as those for containers, virtual machines, and/or hypervisors, as described further elsewhere herein, including further detail provided with respect to FIG. 6 below.

In some further examples, modules or submodules of orchestration 510 may be configured to exert control over the build process 550 module. Based at least in part on input or other considerations received via pipeline jobs 511, CI/CD 512, orchestration library 516, and/or SCT or another part of workflow 518, pipeline agent 514 may be configured to pause 552 or break 554 a build process 550 for a given software deployment, for some use cases.

Insights 520 may reveal some or all of the inputs (e.g., updates and/or risk-based criteria), outputs, or intermediate representations leading to any specific action or set of actions that may be taken in response to particular updates for a given software deployment or component(s) thereof. Predetermined risk-based criteria, and any determinations or intermediate representations regarding actual or potential status or outcomes regarding compliance or governance, for example, or any trends or interrelations thereof, may be queried, presented, displayed, or otherwise processed into various forms of reporting or other output, for example.

Dashboards 530 may present, in any of various formats, metrics 532 (e.g., analytics from SCA or from elsewhere) and/or any corresponding visualization 534, which may be generated using visualization libraries, from data output by any of various DevSecOps tools from elsewhere in DevSecOps architecture 500. Other presentation forms (e.g., audible, tactile, programmatic, etc.) for data or information, may also be configured as part of dashboards 530, in some embodiments.

Feedback 540 may include any of various forms of communication, such as messaging 542 between other tools or stages of DevSecOps pipeline 100 or DevSecOps architecture 500, and/or notifications 544 via channels for organizations or users (e.g., partners, architects, administrators, engineers, developers, among others). An example of an asynchronous communication means includes e-mail 546, which may also serve as an underlying protocol for messaging 542 and/or notifications 544. Additionally, or alternatively, other out-of-band (OOB) communications or actions (activities) may be triggered by way of an interface or abstraction layer such as OOB 548 module for feedback 540, according to some non-limiting example embodiments of the present disclosure.

Data sources 560 may include an issue tracker or ticket system, such as bug tracker 562, code repository, file system, or versioning system such as source code control 564, and/or configuration management database (CMDB) 566, for example. Functionality and objectives of bug tracker 562, source code control 564, and CMDB 566, may include those of equivalent or similar tools as described elsewhere herein. Moreover, any modules or submodules corresponding to data sources 560 may further interface or interact with modules or submodules corresponding to orchestration 510, such as CI/CD 512 or pipeline agent 514, according to some example embodiments.

Built-in IQ 570 (e.g., adaptive pipeline module 400 above) may further include additional constituent modules or submodules, accessible via an application-programming interface (API) 572, among other possible modules or submodules. For example, built-in IQ 570 may further include a data store, such as database 574, which may be configured to facilitate storage and retrieval of structured or unstructured data, including both for the DevSecOps architecture or pipeline, and/or for at least one given software deployment or component(s) thereof.

Additionally, or alternatively, information and sets of possible actions to be taken with respect to at least one given software deployment or component(s) thereof (e.g., as listed in a component manifest) may be encoded in prescription logic 576 and/or tracked in prescription logs 578. Data stored in database 574 and/or prescription logs 578 may serve as inputs or training datasets for any machine-learning models or other artificial-intelligence processes as part of built-in IQ 570, in some embodiments, which may fulfill the role of prescription logic 576 to allow scalability for software deployments of higher complexity.

Figure 6:
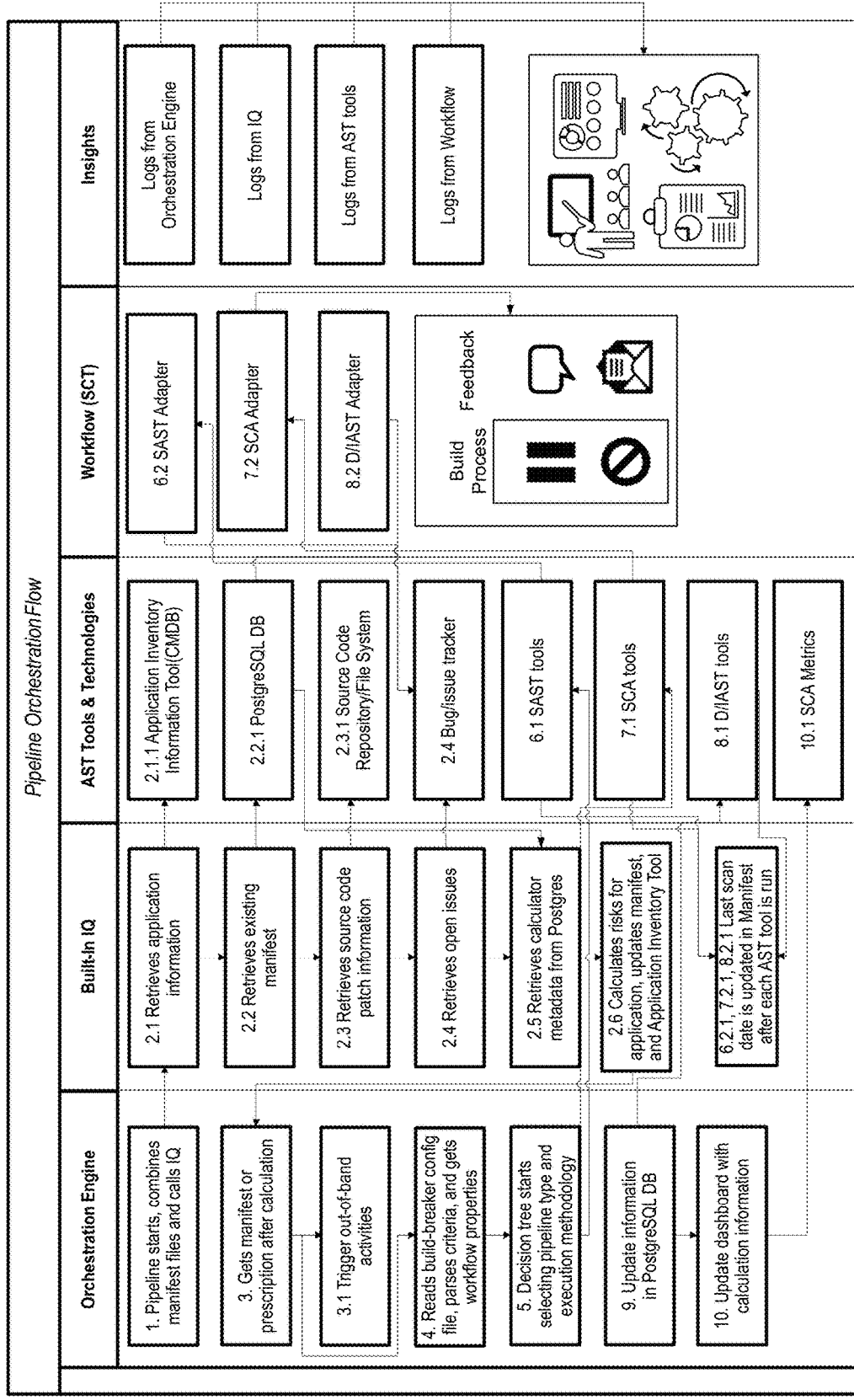
FIG. 6 depicts an example orchestration flow for an intelligent DevSecOps pipeline, according to some embodiments of the present disclosure.

FIG. 6 depicts an example orchestration flow 600 for an intelligent DevSecOps pipeline 100, according to some embodiments of the present disclosure, in keeping with the example DevSecOps architecture 500 depicted in FIG. 5. FIG. 6 shows additional details of example tools, in an embodiment, within different pipeline stages.

The different tools and stages of FIG. 5, as shown separately in FIG. 6, may be controlled or observed from the perspective of a pipeline orchestration engine, such as orchestration 510 module as shown in FIG. 5. Thus, orchestration flow 600 shown in FIG. 6 is one non-limiting example of a flow of control and/or data within and among modules such as those shown in FIG. 5 as part of DevSecOps architecture 500 described above.

Example Risk-Based Criteria and Risk Profiles

FIG. 9 depicts an example risk score card 900 and risk profile including risk-based criteria used for determining further actions, according to some embodiments of the present disclosure. As context for FIG. 9, the risk score card and reference risk matrix reflecting a given risk profile are provided as a capture of a tab view from an example user interface configured to allow insights into various aspects of an intelligent DevSecOps architecture.

In the example shown in FIG. 9, various score components are displayed, reflecting evaluation results corresponding to different parameters, criteria, or aspects of a given risk profile. For example, in response to an update related to at least one component of a software deployment associated with the given risk profile, various parameters may be evaluated, including parameters associated with the update.

Such parameters may include accessibility (e.g., ease of access by attackers to an attack vector and/or vulnerable attack surface), change significance, open vulnerability, business criticality, data classification, and security tooling, and a total or aggregate score combining (e.g., adding, averaging, statistically representing, or otherwise summarizing) multiple evaluation results into one evaluation result, among other possible parameters beyond those shown in the non-limiting example risk score card 900 of FIG. 9. Evaluation results (scores) may be calculated based at least in part on predetermined risk-based criteria and/or an update related to at least one component of a given software deployment and which may affect at least one parameter.

Referring to the reference risk matrix as shown in FIG. 9, different acceptable risk levels (e.g., specified as ranges of acceptable risk scores) for a given software deployment or organization may be configured as risk-based criteria that may form a basis for a given risk profile. These criteria may be reflected, as shown in FIG. 9, for each of several security-related tools that form parts (modules) of a DevSecOps architecture or pipeline, according to some use cases. Criteria may include requirements (e.g., for deliverables or regulatory compliance), a weighting value, a classification, other configuration options, risk tolerance (e.g., thresholds or ranges), accessibility levels (e.g., for attack surfaces or vectors), etc. Further examples of risk-based criteria and risk profiles are described further with respect to FIGS. 20-22, as may apply to other use cases.

In some embodiments, the reference risk matrix of FIG. 9 may alternatively specify actions to be taken within the DevSecOps pipeline in response to a particular evaluation result reaching a given range. Depending on the evaluation result(s) following a given update, and depending on at least some risk-based criteria in the given risk profile. Further non-limiting examples of risk-based criteria and risk profiles are described further with respect to FIG. 23, as may also be applied to other use cases (e.g., CI/CD versus legacy development assessments).

Figure 23:
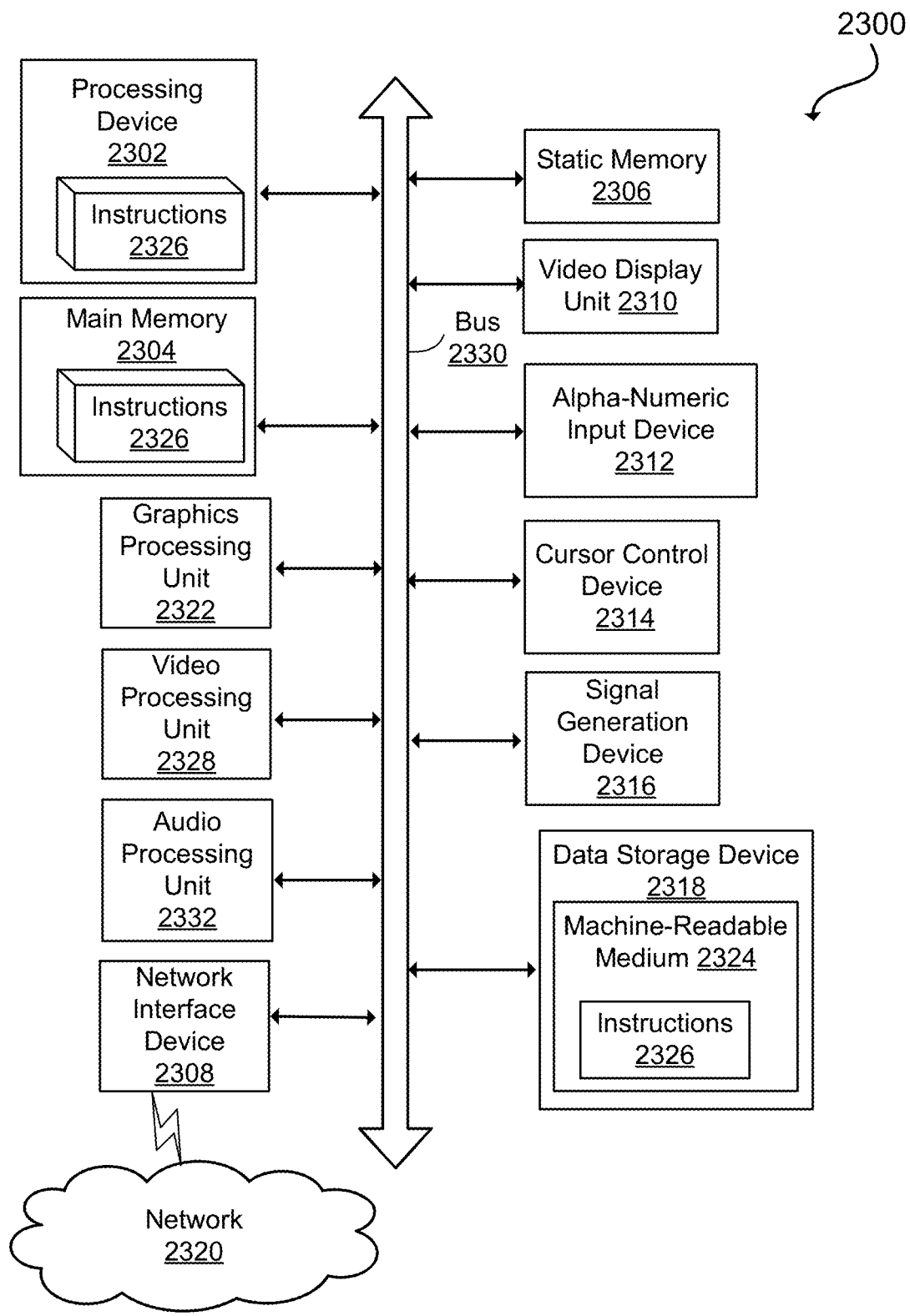
FIG. 23 depicts a diagram of an example computer system in which embodiments of the present disclosure may operate.

FIGS. 20-22 depict examples of risk-based criteria with respect to SSDLC tooling within an intelligent DevSecOps workflow, which may constitute at least part of a given risk profile, according to some embodiments of the present disclosure. FIG. 23 depicts a further example of risk-based criteria for determining further actions based on certain criteria, according to some embodiments of the present disclosure.

Example Workflows

Figure 7:
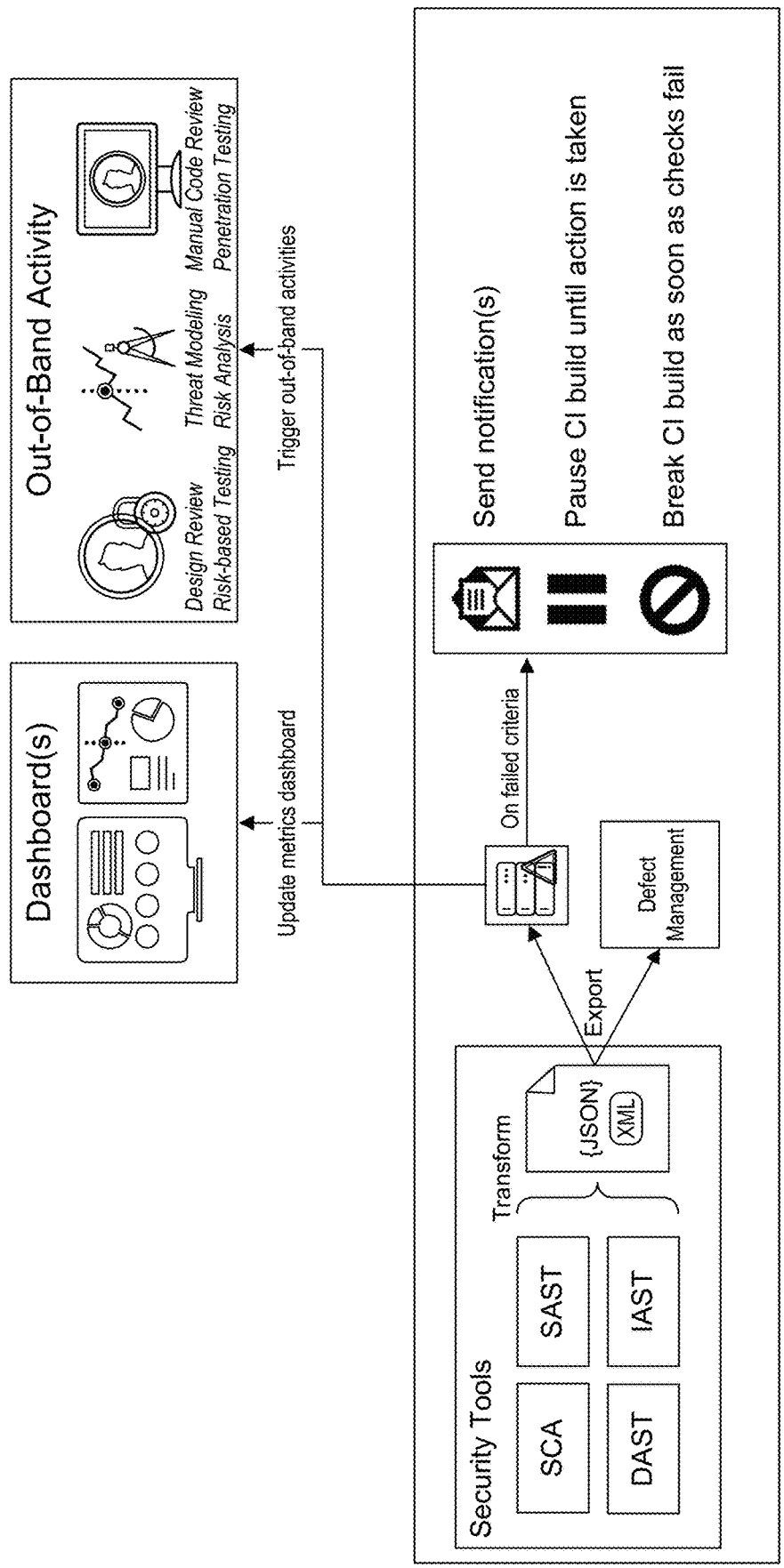
FIG. 7 depicts an example of an intelligent DevSecOps workflow including notification(s), build-breaking, and out-of-band activities, according to some embodiments of the present disclosure.

FIG. 7 depicts an example of an intelligent DevSecOps workflow 700 including notification(s), build-breaking, and out-of-band activities, according to some embodiments of the present disclosure. Functionality and objectives of the tools and corresponding modules and submodules depicted in FIG. 7 are further described elsewhere herein.

Figure 8:
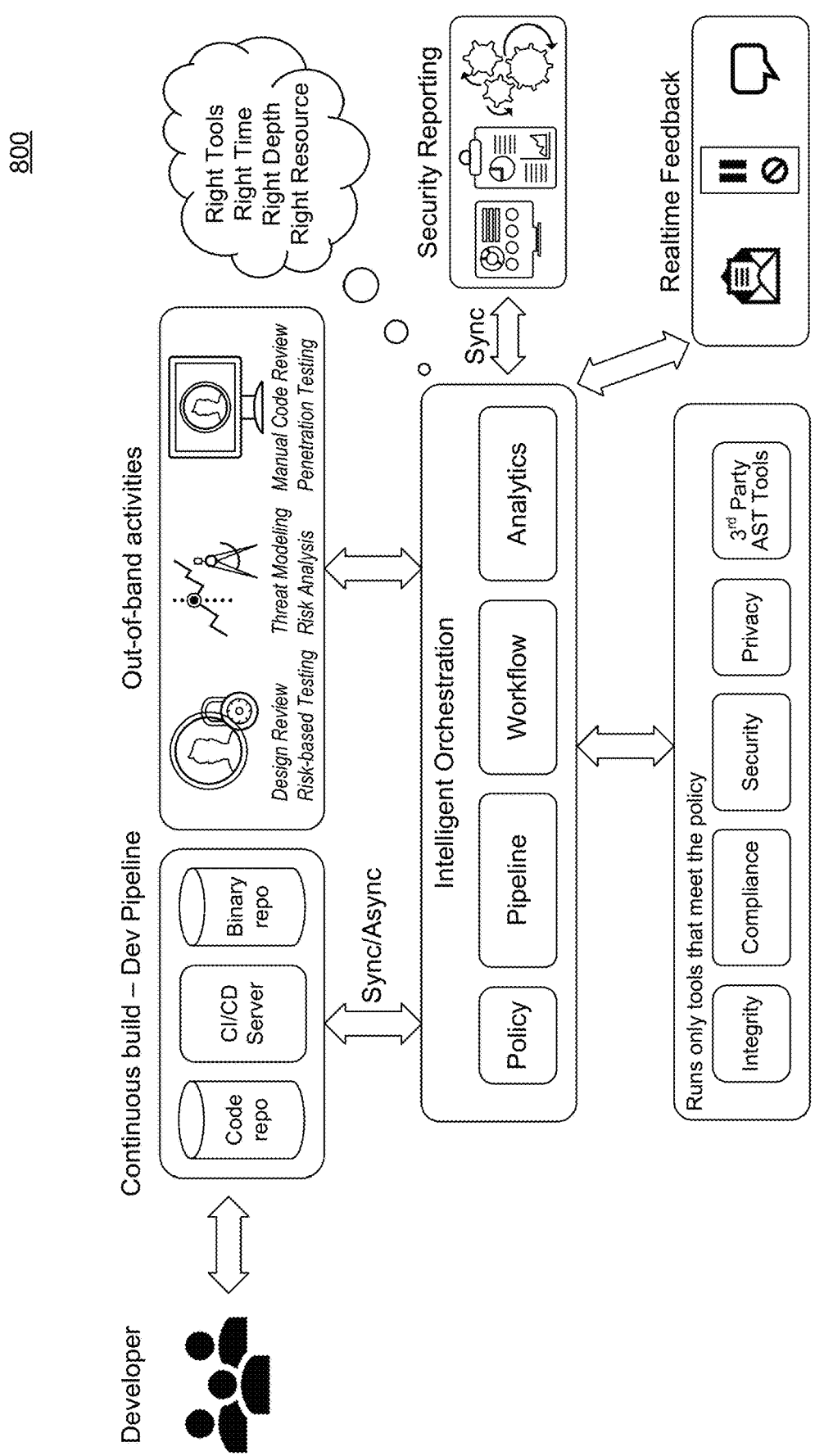
FIG. 8 depicts an example of intelligent orchestration and related workflow in a context of security, policy, and development pipeline, according to some embodiments of the present disclosure.

FIG. 8 depicts an example of intelligent orchestration and related workflow 800 in a context of security, policy, and development pipeline, according to some embodiments of the present disclosure. FIG. 8 shows a developer-oriented view of a continuous-build development pipeline that leverages, transparently on the back-end, intelligent-orchestration tools described elsewhere herein (e.g., policy, pipeline, workflow, analytics, as described with respect to FIGS. 1-6), together with capabilities for out-of-band activities, real-time feedback, and reporting. Doing so may accordingly improve efficiency of tools, time, depth, and resources behind the developer pipeline, so that developers are not overwhelmed with analysis and results of less importance or risk to a given software deployment of interest to their organization(s), for example.

FIGS. 10-16 depict an overview and flow of an example use case for an intelligent DevSecOps pipeline, via example visualizations and interface views per some example embodiments.

Figure 10:
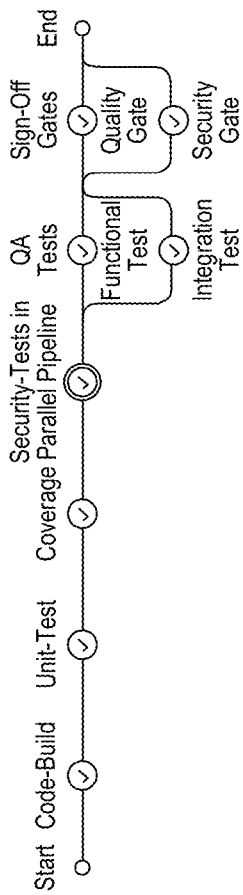
FIG. 10 depicts an example of a reporting view of an intelligent DevSecOps pipeline, according to some embodiments of the present disclosure.
Figure 11:
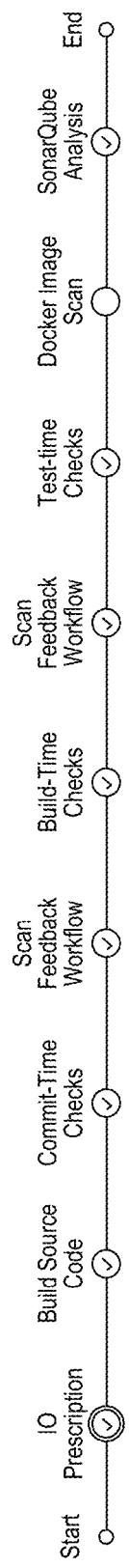
FIG. 11 depicts an example of a detailed reporting view of an intelligent DevSecOps pipeline, according to some embodiments of the present disclosure.
Figure 12:
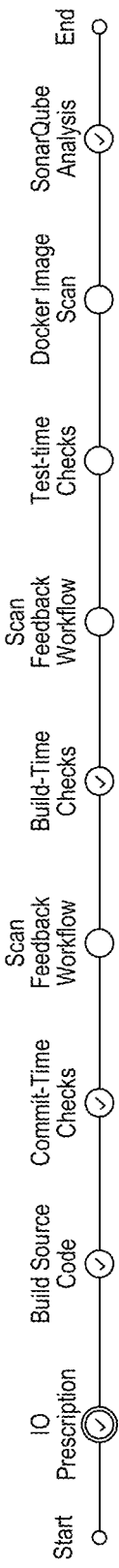
FIG. 12 depicts a further example of a detailed reporting view of an intelligent DevSecOps pipeline, according to some embodiments of the present disclosure.

FIG. 10 depicts an example of a reporting view 1000 of an intelligent DevSecOps pipeline, according to some embodiments of the present disclosure. FIG. 11 depicts an example of a detailed reporting view 1100 of an intelligent DevSecOps pipeline, according to some embodiments of the present disclosure. FIG. 12 depicts a further example of a detailed reporting view 1200 of an intelligent DevSecOps pipeline, according to some embodiments of the present disclosure.

Figure 13:
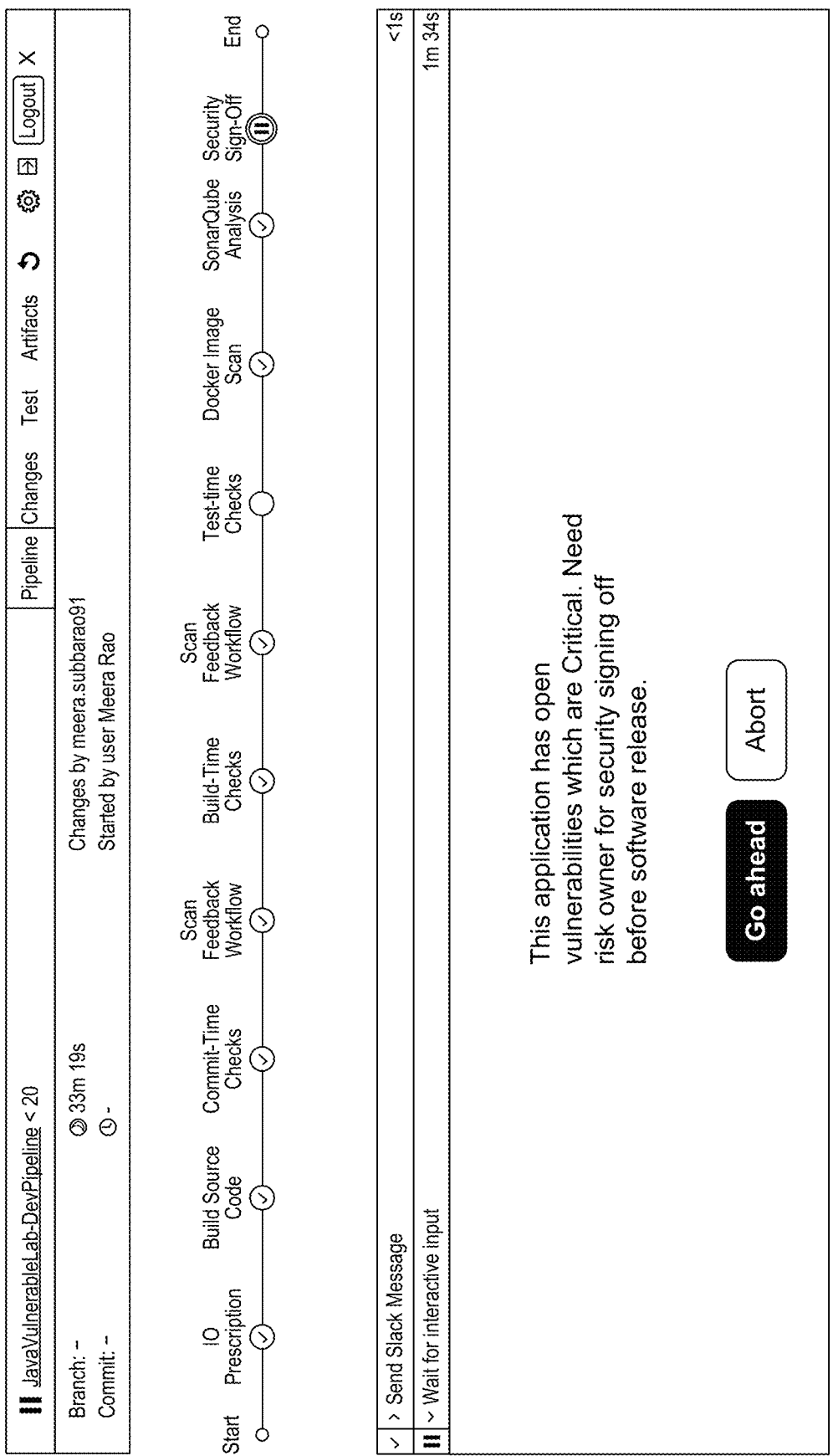
FIG. 13 depicts an example of a prompt for interactive input within an intelligent DevSecOps pipeline, according to some embodiments of the present disclosure.
Figure 14:
FIG. 14 depicts an example of a detailed reporting view of a build breaker within an intelligent DevSecOps pipeline, according to some embodiments of the present disclosure.

FIG. 13 depicts an example of a prompt 1300 for interactive input within an intelligent DevSecOps pipeline, according to some embodiments of the present disclosure. FIG. 14 depicts an example of a detailed reporting view 1400 of a build breaker within an intelligent DevSecOps pipeline, according to some embodiments of the present disclosure.

Figure 15:
FIG. 15 depicts a further example of a detailed reporting view of an intelligent DevSecOps pipeline, according to some embodiments of the present disclosure.
Figure 16:
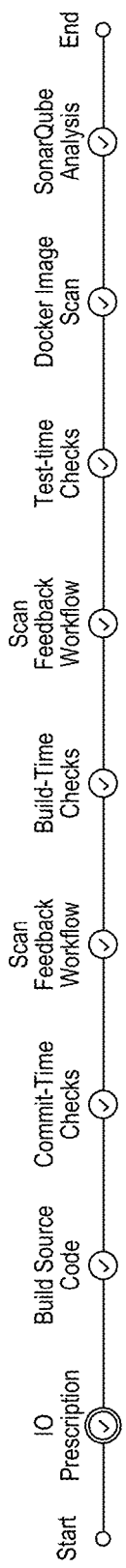
FIG. 16 depicts an example a further example of a detailed reporting view of an intelligent DevSecOps pipeline, according to some embodiments of the present disclosure.

FIG. 15 depicts a further example of a detailed reporting view 1500 of an intelligent DevSecOps pipeline, according to some embodiments of the present disclosure. FIG. 16 depicts an example a further example of a detailed reporting view 1600 of an intelligent DevSecOps pipeline, according to some embodiments of the present disclosure.

Figure 17:
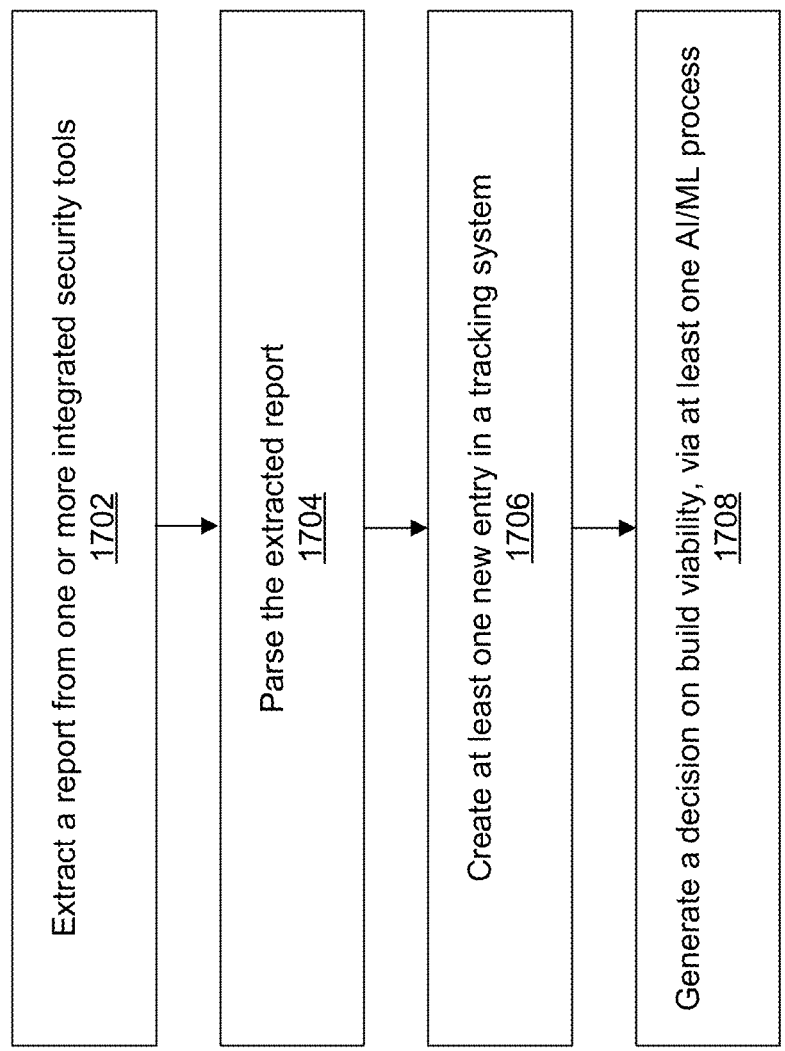
FIG. 17 is a flowchart illustrating a method implementing some of the enhanced techniques described herein, according to some embodiments of the present disclosure.

FIG. 17 is a flowchart illustrating a method 1700 (process) for operation of the enhanced DevSecOps techniques described herein, according to some embodiments. Method 1700 may be performed by processing logic that may include hardware (e.g., circuitry, dedicated logic, programmable logic, microcode, etc.), software (e.g., instructions executing on a processing device), or a combination thereof.

Not all steps of method 1700 may be needed in all cases to perform the enhanced techniques disclosed herein. Further, some steps of method 1700 may be performed simultaneously, or in a different order from that shown in FIG. 17, as will be understood by a person of ordinary skill in the art.

Method 1700 shall be described with reference to FIGS. 1-16 and 18-23. However, method 1700 is not limited only to those example embodiments. The steps of method 1700 may be performed by at least one computer processor coupled to at least one memory device. An example processor and memory device(s) are described above with respect to FIG. 23. In some embodiments, method 1700 may be performed by components of systems shown in FIGS. 4-8, which may further include at least one processor and memory, such as those of FIG. 23.

In 1702, at least one processor 2302 may be configured (e.g., via program code or instructions stored in/on a non-transitory computer-readable storage medium or device) to extract a report from one or more integrated security tools, such as those described elsewhere herein. Examples include SAST, IAST, DAST, SCA, SCT, or other DevSecOps pipeline tools, for example.

In 1704, the at least one processor 2302 may be configured to parse the extracted report of 1702, such as to identify specific vulnerabilities, as well as any specific criteria or values of interest, such as severity, cost, or potential effects (impact), for example.

In 1706, the at least one processor 2302 may be configured to create at least one new entry in a tracking system (e.g., bug tracking system or module), for example, corresponding to one or more items extracted/parsed in 1702 and/or 1704 as described above.

In 1708, the at least one processor 2302 may be configured to generate a decision on build viability, including whether or not to break a given build, based at least in part on a result of any of 1702, 1704, and/or 1706 as described above. In order to generate such a decision, at least one AI/ML, process may be used, as described further elsewhere herein.

To demonstrate benefits of method 1700, some problems to be solved are further described below. An organization that cannot rely on developers reading policy and standards guidelines to effectively comply with rules, and/or that may need to keep pace with modern development practices (e.g., CI/CD) may not have sufficient resources to carry out a large amount of manual or out of band activities.

Thus, in order to meet policy, multiple activities and tools may be in use. Each activity may be its own specialty which may have its own tools, jargon, use case, etc. Each activity/tool may become its own control, requiring individual policies, standards, enforcement and verification. Each control may have its own team, for some use cases. Each control may have separate integration points, configuration formats, output formats, etc.

Accommodating all the differences of each tool may result in slowdowns at each stage of the pipeline, at least if compliance is to be maintained. Processes governing activity/tools are typically "one size fits all" without regards to what policies and/or standards may actually require. Thus, the entire landscape of security activities within the enterprise becomes complex, increasing needs for constant collaboration and scale. Policies or standards themselves may also playing catch-up with modern development practices.

Therefore, solutions to these potential problems may require speed, but security-related practices may create friction, inefficiency, and inconsistency. Similarly, solutions may need to be specific, even while security tools target an increasing number of potential issues, creating complexity that may not be addressed in advance by predetermined decision trees— applying such fixed logic may also result in false positives, hampering quick resolution.

A managed-services approach to testing may help leverage depth of knowledge and experience in application security testing. Benefits may be reaped from the practical operational expertise gained from executing thousands of tests per year for some of the world's most demanding clients.

Testing capacity may be available on demand for testing on a client's schedule, generating rapid response to evolving threats. Managed service assessments may be used to run anything from automated scans to in-depth manual penetration tests.

Intelligent DevSecOps solutions described herein may offer multiple assessment types to match the depth of test to the risk profile of each application in a portfolio, such as from lightweight automated testing to manual business logic testing, from web- or mobile-application testing to client/server applications, etc., and/or from lightweight design reviews to multiple levels of code review assessments, for example.

Vulnerability remediation guidance and support may be provided by internal or external groups or databases, including through post-assessment reports and expert-led readouts with developers or application stakeholders. Experts or other third-party resources may provide remediation guidance to enable correction of discovered vulnerabilities.

In some embodiments, artificial intelligence (AI), including machine learning (ML) processes may be configured to adapt and evolve some aspects a DevSecOps pipeline, to respond to increasingly complex scenarios that may not be determinable in advance. Specific data structures, algorithms, and related processes are described further herein.

Dynamic Application Security Testing (DAST)

As part an application security testing (AST) portfolio, DAST assessments may use penetration testing while web applications are running to simulate an attack by a skilled and motivated attacker. This enables clients to identify security vulnerabilities and determine real-world risk to their organization.

DAST—Essential (DAST-E) may be a high-level, low-cost security scan using automated tools to identify vulnerabilities within running web applications or web services without the need for source code. This approach may be used for internally facing, low-risk applications to comply with regulatory security assessments, for example.

DAST—Standard (DAST-S) may provide an in-depth testing that employs automated scanning and dozens of different manual test cases customized for the technology platform and risk profile of each application. This approach may be suitable for medium-risk applications or critical applications undergoing minor changes, in some use cases.

Penetration Testing

Penetration testing assessments may take in-scope applications and leverage architecture, development language, and business functionality to determine which methodologies, which scanning technologies, and which manual exploit consultants may be suitable for a given task. This approach may result in a more comprehensive review and higher quality test results.

Penetration Testing—Essential (PT-E) may include automated scans as well as thorough manual testing focused on exploratory risk analysis. Time-boxed manual security assessment may identify high-risk vulnerabilities in web applications and web services, which automated scanners generally may not find.

Penetration Testing—Standard (PT-S) may additionally include additional time and effort exploring deeper business-logic testing, so as to cover attacks outside of a predetermined list, or other attacks that may not have been considered in other automated or basic testing. A threat-modeling activity drives the deeper business logic testing as part of this assessment.

Multiple testing tools may be combined like automated scans and in-depth manual tests to get the most comprehensive security assessment of client-side web applications, web services and APIs.

Mobile Application Security Testing (MAST)

Mobile AST assessments combine static and dynamic testing techniques to discover malicious or potentially risky actions that mobile applications may be causing unknowingly. This approach may allow consideration of aspects specific to mobile security, including critical business logic and how applications and systems interoperate. This methodology may be used to assess platform-specific or platform-agnostic vulnerabilities.

Using a combination of proprietary static and dynamic analysis tools, which work together rather than in isolation, vulnerabilities can be discovered accurately and efficiently. Unlike with web applications, analysis of mobile apps may provide security teams a level of visibility into mobile application security, even without access to source code.

Mobile specialists may be available to review every test to eliminate false positives. Thorough analysis of results may be provided through detailed reporting and actionable remediation guidance.

Mobile-Standard (MAST-S) analysis of mobile client-side application components may be employed to use various static-analysis tools and/or dynamic-analysis tools, such as automated scans.

Mobile-Comprehensive (MAST-C) analysis of both client-side and server-side functionality may be available for mobile applications using a suite of proprietary static analysis and dynamic analysis tools.

Network Security Testing (NST)

Network security testing may be used to find holes in internal and external networks that can be compromised by attack agents. Vulnerabilities that may be identified may be further detailed, including ranking of the risks they present to a client's business, and provide a clear mitigation strategy. The holistic NST approach has been developed through years of assessment experience. Three distinct assessment levels may be available based on scope of activity, depth of analysis, breadth of testing, and deliverables, according to some embodiments.

Network Security Testing-Essential (NST-E) may include an in-depth network test configured to employ automated scanning with a manual triage of vulnerabilities identified. Manual testing checklists may include test cases for encrypted transport protocols, SSL certificate scoping issues, use of administrative services, etc.

Network Security Testing-Standard (NST-S) may include time-boxed manual security assessment on the IP addresses provided and the functionalities that are available through the various network services. In addition to everything NST-E offers, this provides manual checks not normally found with automated testing. For example, vulnerabilities related to complex routing paths, access control configurations, business logic, and any functionality that is available through the exposed network services.

Static Application Security Testing (SAST)

As part of an AST portfolio, delivered as a managed service or professional service, SAST assessments may enable clients to quickly implement and scale static analysis to systematically find and eliminate software security vulnerabilities found in source code in a cost-effective manner.

Multiple depths of secure code review (SCR) may be offered to find and eliminate common to critical software security vulnerabilities within source code. Automated tools may be used to find critical/high/medium vulnerabilities in source code. Automated tool-based scans may be augmented with a manual triage of results. Automated tool-based scans may be complemented with manual exploration of vulnerabilities. Manually exploration of attack surfaces and frameworks may also be improved in combination with the automated techniques described herein.

Static Application Security Testing—Automated (SAST-A) may be used to deploy automated tools to identify common/high vulnerabilities such as SQL injection, cross-site scripting, buffer overflows, and the rest of the Open Web Application Security Project (OWASP) Top Ten (a standard awareness document for developers and web application security), for example.

Static Application Security Testing—Essential (SAST-E) may be used to customize automated tools by adding hundreds of created rules to find vulnerabilities that out-of-the-box tools cannot find. A manual review may be included to identify false positives and a readout call to explain findings, according to some embodiments Static Application Security Testing—Standard (SAST-S): May extend the SAST-E to identify vulnerabilities not visible to automated scanning such as injection attacks. SAST-S may also include a readout call with remediation guidance, for some use cases.

Static Application Security Testing—Comprehensive (SAST-C) may be used to beyond SAST-S to perform framework-specific and business logic analysis, which automated tools may not be capable of doing. SAST-C may include a readout call with remediation guidance, in some examples.

Example Method

Figure 18:
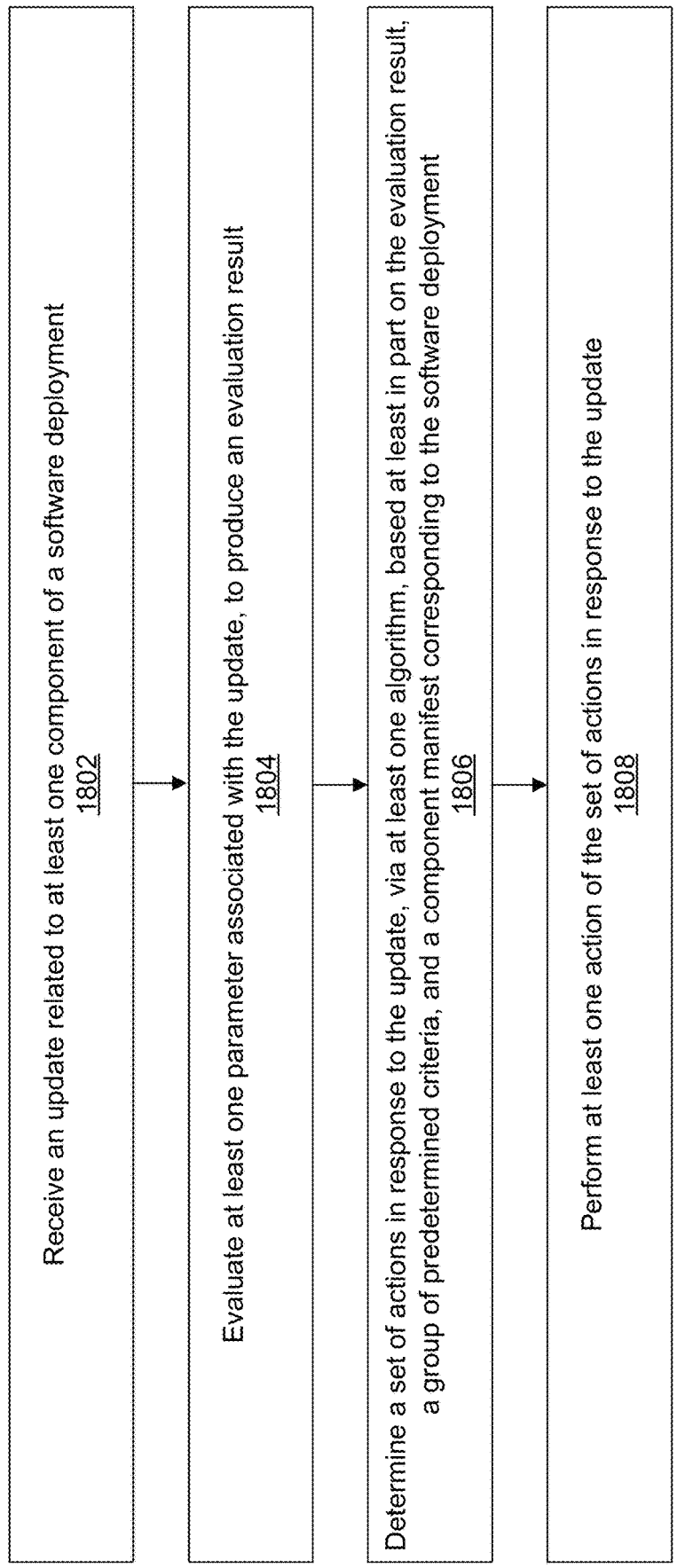
FIG. 18 is a flowchart illustrating a method implementing further enhanced techniques described herein, according to some embodiments of the present disclosure.

FIG. 18 is a flowchart illustrating a method 1800 (process) for operation of the enhanced DevSecOps techniques described herein, according to some embodiments. Method 1800 may be performed by processing logic that may comprise hardware (e.g., circuitry, dedicated logic, programmable logic, microcode, etc.), software (e.g., instructions executing on a processing device), or a combination thereof.

Not all steps of method 1800 may be needed in all cases to perform the enhanced techniques disclosed herein. Further, some steps of method 1800 may be performed simultaneously, or in a different order from that shown in FIG. 18, as will be understood by a person of ordinary skill in the art.

Method 1800 shall be described with reference to FIGS. 1-17 and 19-23. However, method 1800 is not limited only to those example embodiments. The steps of method 1800 may be performed by at least one computer processor coupled to at least one memory device. An example processor and memory device(s) are described above with respect to FIG. 23. In some embodiments, method 1800 may be performed by components of systems shown in FIGS. 4-8, which may further include at least one processor and memory, such as those of FIG. 23.

In 1802, at least one processor 2302 may be configured (e.g., via program code or instructions stored in/on a non-transitory computer-readable storage medium or device) to receive an update related to at least one component of a software deployment, according to some embodiments. For purposes of method 1800, a software deployment may include code (e.g., executable or interpreted instructions and/or source code to be sent or fetched, compiled or interpreted, and/or executed or run, locally or remotely). Such code may be used in any phase of the software deployment, including testing, staging, or production, for example. Code may include any local or remote source files, include files, headers, libraries, dependencies from upstream projects, API definitions, or equivalent data structures, to name a few non-limiting examples from some use cases.

However, the extent of a software deployment is not strictly limited to code per se. A given software deployment may also include development toolchains; processes or scripts for build automation, configuration management, infrastructure management or orchestration (e.g., for virtual machines, containerized applications, and/or intercommunication therebetween); locally or remotely hosted resources for automated or semi-automated testing, verification, and/or validation (e.g., for compliance with standards, identifying or removing security vulnerabilities, etc.); repositories that may store code for distribution, inspection, and/or version control of the code, documentation, data, or other content or materials that may accompany the software deployment; any other tooling that may be used in continuous integration, continuous delivery (CI/CD), including any standard or custom-made DevOps or DevSecOps pipelines or workflows; or any combinations or sub-combinations thereof, according to some embodiments.

The above examples of what may constitute a software deployment are not exhaustive—any of the above elements or their equivalents may be components of a software deployment. An update to a component of a software deployment may be understood to include a merge or revision of code into a source-code repository so as to add or modify functionality or features (e.g., business logic, interface tools, design (look and feel), references to different libraries internal or external to the code base in the repository, etc.) of the software deployment. Even without the type of direct change to the underlying code mentioned above, any component(s) of the software deployment may be considered to be updated for a given software deployment via a change to any related external references, such as a new version of a dependency (e.g., new version of a third-party software package, library, framework, etc., to be imported or otherwise incorporated into a given software deployment), or such as a new or updated entry in a database of security vulnerabilities, weaknesses, or threats (affecting the given software deployment directly or indirectly via external code dependencies), to provide a few example use cases.

Whether or not a given component is considered code per se in a traditional development context, components that may be quantified and tracked in a similar way (e.g., configuration management via YAML files, build automation via scripts, workflow via tickets, auditing via scan reports, etc.), such components may be managed in a repository that is similar or equivalent to (or the same as) that used for software code. In this way, such incidental components may effectively be handled "as code," for example, with configuration-as-code components, infrastructure-as-code components, pipeline-as-code components, governance-as-code components, policy-as-code components, security-as-code components, compliance-as-code components, collaboration-as-code components, etc., aiding robust, proactive management, including application security, of software deployments at enterprise scale. Additional details are also listed elsewhere herein, including in Table 1 above, according to some embodiments.

Thus, to receive an update related to at least one component of a software deployment, per 1802, the at least one processor 2302 may be configured to receive a message or other data structure indicating the update to the at least one component of the software deployment. For example, a message or other data structure may include plain text in any encoding standard, binary code in any structured format (e.g., flags, tokens, etc.), or any combination thereof, transferred electronically or via another medium, using any standard or custom protocol, according to some embodiments. Over certain network media or layers thereof, updates per 1802 may be communicated in structured formats, including JSON or XML (Extensible Markup Language), as some non-limiting examples.

According to some embodiments, to receive such updates, per 1802, processor 2302 may be configured to query or poll at least one service, which may be hosted on a same machine or network as the at least one processor 2302, or may be hosted on another machine or network (e.g., accessible via the Internet). This action serves as a non-limiting example of how at least one processor 2302 may determine whether a given component or any component of a given software deployment has been updated. Further examples follow.

To determine updates for relevant components of a given software deployment, components may be listed in at least one application inventory or component manifest, which may include one or more listings in at least one text file or data structure (e.g., JSON, YAML, structured binary, database, etc.) that reference specific packages for which updates may be received or checked. To determine updates for one or more components, pull-based checking (e.g., querying or polling) may be time-based (e.g., scheduled or periodically recurring) and/or event-driven (e.g., manual check, or in response to another known update), according to some use cases. Querying or polling may be performed hierarchically, for example, by at least one designated machine checking the one or more components for updates and compiling updates from the one or more components, and whereby the updates cached on the at least one designated machine may be queried separately by another machine to receive the updates as a batch or digest, according to some embodiments.

Additionally, or alternatively, updates may be provided for receipt by processor 2302, such as via a publish/subscribe model (e.g., data streams or feeds), or via a push model, for example. Thus, to receive updates per 1802, processor 2302 may be configured to receive the updates passively (receiving updates when available) or actively (querying or polling to check for any available updates).

In 1804, processor 2302 may be configured to evaluate at least one parameter associated with the update, to produce an evaluation result. For example, with any of the updates described above, a set of parameters may be associated with any given update related to any particular component of the software deployment.

Parameters may take into account any technical, legal, or business considerations, among other considerations, according to various applicable use cases. By way of further example, parameters may include, but are not limited to, a type or subtype (e.g., event-driven, manual; time-based, periodic; etc.); criticality of an affected application or component (e.g., effect on the rest of the software deployment); severity (e.g., extent of a security vulnerability, weakness, threat, or other potential or actual compromise); accessibility of a given service, application, or component, such as with respect to a corresponding security issue (e.g., attack surface, threat vector, etc.); data classification (e.g., level of access and/or sensitivity of potentially affected data); compliance factors (e.g., whether or to what extent an update may affect regulatory compliance, legal compliance, intellectual property (IP) licensing compliance, or other requirements with which the software deployment may be expected to comply); and/or level of risk, including a likelihood of failure, likelihood of security compromise, severity of failure or compromise, type or cost of testing, monitoring, mitigation, or remedy (e.g., in terms of opportunity cost, money, hours, labor, downtime, etc., to fix), or other degree of significance of the update as may be involved in calculating a potential level of risk level; in some embodiments.

Any other external, internal, or other custom parameters may be associated with a given component. Further examples are shown in FIG. 20-22 at different levels of detail. Parameters may be flat or hierarchical with respect to other parameters, and may allow for varied levels of granularity with respect to different components and evaluation of respective parameters associated with corresponding updates relating to respective components of a software deployment.

Differences in scope or granularity of parameters may result from different amounts of available data for any given parameter, for example. Not all parameters may apply to every associated component, for example. Parameters and/or data corresponding to particular parameters may be derived from specific sources for purposes of certain evaluations. For example, data points for certain parameters may be given as settings in configuration file, answer file, result file, or other file, data structure, or data stream.

Parameters and/or corresponding data in such formats may be given by manual input, such as via responses to a survey or form questionnaire. Additionally, or alternatively, parameters and/or corresponding data may be derived from tags, properties, attributes, metrics, or analytics associated with corresponding repositories, databases (or entries therein), test results (e.g., results of manual or automatic code scanning, such as static or dynamic code analysis, penetration testing, fuzz testing, etc.), or other mutable or immutable characteristics of a given component of a software deployment, according to some embodiments.

Moreover, any qualitative scores, including relative scores (e.g., yes/no; critical, high, medium, low; physical access, intranet access, partner access, Internet/global access; etc.) or enumerated classifications (e.g., SCA, SAST, IAST, runtime application self-protection (RASP); financial regulations, industry regulations; etc.) may have predetermined or customized quantitative values or weights assigned for purposes of evaluating specific parameters at a given time of 1806, for example. Further examples may be found elsewhere herein, at least at FIG. 21 and any accompanying description. Such qualitative and/or quantitative values or weights may be processed accordingly via at least one algorithm to generate at least one evaluation result.

Thus, evaluation of certain parameters may depend on data corresponding to certain other parameters. For example, a specific level of risk may be specified in advance as a value of a parameter, as may correspond to a given compliance requirement applicable to a given software deployment or component thereof. An update to a given code repository may trigger static application security test, which may in turn indicate an elevated risk in terms of a new vulnerability class introduced by an addition or modification of code reflected in the update to the given code repository. Additionally, or alternatively, a parameter may reflect an elevated risk by way of an update to a security vulnerability database newly indicating that an existing component of the software deployment is affected by a newly discovered vulnerability, even if the corresponding code has not been recently modified.

Following either or both of these examples of updates leading to parameters indicating elevated risk, a further evaluation of another parameter may, in turn, further indicate that a risk value is elevated above a predetermined acceptable risk and/or that the software deployment or component thereof is currently failing at least one compliance requirement as of the update. Accordingly, a comparative or qualitative value (e.g., risk exceeds acceptable level or is within acceptable level; compliant or non-compliant; etc.), and/or any intermediate quantitative values, may be included in at least one result of the evaluating at least one parameter to produce an evaluation result, in some embodiments.

In accordance with the above examples, those skilled in the art will appreciate that the level of coordination required for monitoring and evaluation of specified parameters at a scale of typical enterprise-level software deployments that may include components numbering in the dozens to hundreds, if not thousands or more, cannot be performed by a human developer, manager, or team thereof. Rather, one or more specialized computing algorithms, data structures, and/or hardware configurations, as described in more detail elsewhere herein, become useful for processing operations of method 1800, including 1804 (above) and/or 1806 (below), at least for certain use cases according to some embodiments.

In 1806, processor 2302 may be configured to determine a set of actions in response to the update, via at least one algorithm, based at least in part on the evaluation result, an application dataset corresponding to the software deployment, and a group of predetermined criteria.

Continuing with the examples of the parameter evaluations and results thereof as described above with respect to 1804 and elsewhere herein, an evaluation result such as that produced as a result of 1804 may be further processed, together with a group of predetermined criteria and a component manifest corresponding to the software deployment. Other factors or inputs may be processed in addition, according to some use cases.

In 1808, processor 2302 may be configured to perform at least one action of the set of actions in response to the update. By performing the at least one action as determined in 1806, processor 2302 may thereby effect a transformation to another process, thing, or material. Thus, the at least one action may trigger a physical response of an indicator, such as a switch, relay, lamp, bell, buzzer, or another notification device, for example, or may cause movement or transportation of an object from one location to another location. Actions beyond the scope of a given software deployment in which an update may trigger an evaluation or determination may include out-of-band actions, which may further include notifications or other communications or actions outside of a given software deployment or SDLC/DevOps/DevSecOps pipeline or equivalent pipeline or workflow, for example.

In further embodiments of 1808, processor 2302 may initiate, interrupt, break, terminate, or abort a process of the software deployment. A process of the software deployment may include a build process, testing process, staging process, distribution process, registration process, execution process, instantiation process, boot process, shutdown process, destruction process, etc. Such actions of initiating, interrupting, breaking, terminating, aborting, with respect to different processes or components may be performed hierarchically and/or conditionally, such as applying a set of breakpoints, checkpoints, gates, or the like, which may include conditional thresholds or tiers, or nested data structures, among other arrangements, in some embodiments, to account for dependency relationships and/or downstream complications of breaking a build process upstream, for example.

For example, in an example use case, processor 2302 may evaluate, in 1804, a given risk of a particular compromise (e.g., remote code-execution vulnerability) in a particular component, and that this given risk has increased as a result of an update. At either or both of 1804 or 1806, processor 2302 may determine (e.g., via at least one algorithm, including an ML process or related algorithm) that the given risk is correlated with at least one other risk that may affect the software deployment (e.g., compliance failure, chained exploits such as for privilege escalation and/or compromise of at least one other component).

Based at least in part on the above evaluation(s) and/or determination(s), processor 2302 may in turn determine, in 1806, a set of actions that may be performed in response to the update. In some embodiments, the action may be in association with the software deployment or any particular component thereof. By way of further example, the evaluation of elevated risk of compromise for a particular component may result in determining the set of actions that may be taken with respect to that same component, such as testing, patching, upgrading, omitting, substituting, or any combination thereof.

Moreover, at the determining (1806), a group of predetermined criteria may factor into the determining of the set of actions. According to some embodiments, the group of predetermined or other specified criteria may include, or be derived at least in part from, the at least one parameter associated with the update, at least one characteristic of the software deployment or any component thereof, at least one external factor (e.g., status of deployment environment, partner, end-user, or other party that may be affected by the software deployment), or the like.

The at least one action to be performed in 1808 may be selected from the set of actions, according to some embodiments, based at least in part on the group of predetermined criteria, the at least one external factor, at least one other input, or any combination thereof, to provide a few non-limiting examples. Thus, by way of still further example, in response to a received update at 1802 being evaluated at 1804 to show elevated risk in a particular component such that at least one additional risk factor crosses threshold value specified by at least one parameter, processor 2302 may in turn determine, in 1806, a set of actions that may be taken beyond the scope of actions with respect to the particular component having an elevated risk evaluation.

For example, in a case where an update indicates a critical vulnerability in an encryption component, causing an elevated risk of disclosure of sensitive information, actions that may be performed in response may include substitution of the vulnerable encryption component with another encryption component that is not known to be vulnerable. Additionally, or alternatively, other actions may include taking software components or deployments out of production, or for internal use only, or completely offline. Additionally, or alternatively, other actions may include notifying users and/or developers of the vulnerable component or of potential effects of having used or continuing to use the vulnerable components or software deployments.

For purposes of the determining (1806), processor 2302 may further process the evaluation result of 1804 together with a component manifest and a group of predetermined criteria (which may include the at least one parameter), via at least one algorithm. Thus, to continue the above example, the component manifest and group of predetermined criteria may broaden or narrow the set of actions compared to actions that may otherwise be considered with respect to a software deployment's given component in isolation. The component manifest may identify any or all other components of the software deployment, in some use cases. Additionally, or alternatively, a given parameter, or any of the predetermined criteria, for example, may be used by the algorithm to weight or eliminate other potential actions from the set of actions. The set of actions may additionally be ordered, ranked, or otherwise prioritized, in some embodiments.

Management of modern software deployments and development pipelines thus may tend to breed complexity by its nature, not only for software deployments having dozens to thousands or more of constituent components, but also for the various criteria, parameters, or other factors, which may have different ranges of values that may be discrete or effectively continuous. Due to this complexity, conventional automation of software development lifecycle management by way of preprogrammed logic or decision trees may be inadequate for maintaining secure, high-availability software deployments for modern applications, or any corresponding development pipelines or workflows, in many use cases.

To solve the technical problems stemming from such complexity, more sophisticated algorithms or processes, such as employing simulations, regressions, machine-learning capabilities or other artificial-intelligence techniques, may be trained or otherwise leveraged to carry out the determining in 1806, including any expanding, shrinking, ordering, ranking, or prioritizing the set of actions that may be performed in 1808, in response to the evaluation result of 1804 corresponding to the update received in 1802. For example, actions or sets of actions may be determined and/or selected, such as via at least one algorithm tuned with a goal to improve robustness of a software development (reducing downtime) and/or to mitigate potential security vulnerabilities (reducing attack surface, scope of privilege, etc.).

Targeting one or more qualitative or quantitative objectives (goals), at least one artificial intelligence (AI) technique may be employed, such as by being added to a continuous-integration toolchain or DevSecOps pipeline, for example, to perform operations of method 1800, including determining (1808) a set of actions. Such AI techniques may include clustering algorithms or classification algorithms, any related data structures, or similar processes, e.g., probabilistic forecasting models, predictive forecasting models, Kalman filters (FKF, LQE, etc.), density functions, regression analyses, mean shift, hidden Markov models, Bayesian inference, Gaussian process, k-means clustering, kernel perceptrons, multi-layer perceptrons, kernel machines, support-vector machines (SVM), balanced iterative reducing and clustering using hierarchies (BIRCH), change-point detectors, convolutional neural networks (CNN) or other artificial neural networks (ANN), regression analyses, decision trees, random forests, supervised or unsupervised machine learning (ML) models, or equivalent processes, listing only a few non-limiting examples.

For classification, including ML-based classification, training, or related processes, an AI-enhanced workflow for a given pipeline, or corresponding component of a pipeline or software deployment, may store its separate classification models and data sets, further refining outcomes for particular action-selection criteria or risk-evaluation criteria, for example. Such more specific models, algorithms, and/or techniques may be weighted over predefined or generic models, or any preloaded training data (default data sets), for example.

Deep learning, convolution processing, natural-language processing (NLP), computer vision, optical character recognition (OCR), spectral analyses, and/or other related techniques, may be further integrated into a given SDLC, DevOps, DevSecOps, or similar pipeline or workflow, to collect additional data or to refine the results (accuracy, relevance, net effect) of the evaluating (1804) and/or determining (1806), and/or in furtherance of the one or more goals or objectives of the at least one AI technique being employed for or within the given pipeline or workflow, for example.

Example Computer System

FIG. 23 illustrates an example machine of a computer system 2300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 2300 includes a processing device 2302, a main memory 2304 (e.g., read-only memory (ROM), flash memory, dynamic random access memory (DRAM) such as synchronous DRAM (SDRAM), a static memory 2306 (e.g., flash memory, static random access memory (SRAM), etc.), and a data storage device 2318, which communicate with each other via a bus 2330.

Processing device 2302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 2302 may also be one or more special-purpose processing devices such as an application specific integrated circuit (ASIC), a field programmable gate array (FPGA), a digital signal processor (DSP), network processor, or the like. The processing device 2302 may be configured to execute instructions 2326 for performing the operations and steps described herein.

The computer system 2300 may further include a network interface device 2308 to communicate over the network 2320. The computer system 2300 also may include a video display unit 2310 (e.g., a liquid crystal display (LCD) or a cathode ray tube (CRT)), an alphanumeric input device 2312 (e.g., a keyboard), a cursor control device 2314 (e.g., a mouse), a graphics processing unit 2322, a signal generation device 2316 (e.g., a speaker), graphics processing unit 2322, video processing unit 2328, and audio processing unit 2332.

The data storage device 2318 may include a machine-readable storage medium 2324 (also known as a non-transitory computer-readable medium) on which is stored one or more sets of instructions 2326 or software embodying any one or more of the methodologies or functions described herein. The instructions 2326 may also reside, completely or at least partially, within the main memory 2304 and/or within the processing device 2302 during execution thereof by the computer system 2300, the main memory 2304 and the processing device 2302 also constituting machine-readable storage media.

In some implementations, the instructions 2326 include instructions to implement functionality corresponding to the present disclosure. While the machine-readable storage medium 2324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 2302 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Computer system 2300 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 2300 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

As used herein, the term "module" may signify a tangible data- or information-processing device, that may be limited in size or complexity. Additionally, a module may refer to at least one method or procedure to transform data or information, such as in a computer program. A module may also refer to a network of digital logic devices, such as gates, latches, flip-flops, and/or registers, for example, in which interconnections among logic devices may give structure to the network.

Temporarily configured modules need not be configured at any one time. For example, a processor comprising one or more modules may have the one or more modules configured separately at different times. The processor may comprise a set of one or more modules at one particular time, and may comprise a different set of one or more modules at a different time. The decision to manufacture or implement a module in a permanently configured form, a temporarily configured form, or any combination of the two forms, may be driven by cost, time considerations, engineering constraints and/or specific design goals. The substance of a module's processing is independent of the form in which it may be manufactured or implemented.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving, by at least one processor, a risk profile associated with a software deployment, and an update related to the software deployment, the update comprising a merge of code into a source-code repository;
   evaluating, by the at least one processor, at least one parameter associated with the update to produce an evaluation result, the evaluation result comprising a determination that a risk associated with one or more components of the software deployment in isolation has increased as a result of the update;
   determining, by the at least one processor, a modified set of actions in response to the update, based at least in part on an initial set of actions, the evaluation result, a group of specified criteria on which the risk profile is based, and a component manifest corresponding to the software deployment, wherein the initial set of actions is associated with the one or more components of the software deployment in isolation, wherein the modified set of actions comprises at least one action not included in the initial set of actions, wherein the at least one action not included in the initial set of actions corresponds to the increased risk associated with the one or more components of the software deployment in isolation, and wherein the at least one action not included in the initial set of actions affects at least one additional component not included in the one or more components of the software deployment in isolation; and performing, by the at least one processor, at least one action of the modified set of actions in response to the update.

2. The method of claim 1, wherein the update related to the software deployment comprises an update to at least one of the specified criteria corresponding to the risk profile associated with the software deployment.

3. The method of claim 2, further comprising:
calculating, by the at least one processor, an updated risk profile corresponding to the software deployment, based at least in part on the update to the at least one of the specified criteria corresponding to the risk profile associated with the software deployment.

4. The method of claim 1, wherein the at least one action of the modified set of actions in response to the update comprises:
updating, by the at least one processor, a log entry or a tracking system;
updating, by the at least one processor, a metric in a monitoring system;
triggering, by the at least one processor, an out-of-band activity;
interrupting, by the at least one processor, a build process; or
generating, by the at least one processor, a notification via at least one channel.

5. The method of claim 1, wherein determining the modified set of actions in response to the update is further based on an output of a machine-learning algorithm.

6. The method of claim 1, wherein the at least one parameter comprises at least one result of at least one type of security testing.

7. The method of claim 1, wherein the group of specified criteria comprises at least one of a requirement, a weighting value, a classification, a configuration option, a risk tolerance, or an accessibility level.

8. The method of claim 1, wherein the component manifest comprises a code repository, a vulnerability database, or a combination thereof.

9. A system comprising:
a memory; and
at least one processor coupled to the memory and configured to:
receive a risk profile associated with a software deployment, and an update related to the software deployment, the update comprising a merge of code into a source-code repository;
evaluate at least one parameter associated with the update, to produce an evaluation result, the evaluation result comprising a determination that a risk associated with one or more components of the software deployment in isolation has increased as a result of the update;
determine a modified set of actions in response to the update, based at least in part on an initial set of actions, the evaluation result, a group of specified criteria on which the risk profile is based, and a component manifest corresponding to the software deployment, wherein the initial set of actions is associated with the one or more components of the software deployment in isolation, wherein the modified set of actions comprises at least one action not included in the initial set of actions, wherein the at least one action not included in the initial set of actions corresponds to the increased risk associated with the one or more components of the software deployment in isolation, and wherein the at least one action not included in the initial set of actions affects at least one additional component not included in the one or more components of the software deployment in isolation; and perform at least one action of the modified set of actions in response to the update.

10. The system of claim 9, wherein the update related to the software deployment comprises an update to at least one of the specified criteria corresponding to the risk profile associated with the software deployment.

11. The system of claim 10, wherein the at least one processor is configured to calculate an updated risk profile corresponding to the software deployment, based at least in part on the update to the at least one of the specified criteria corresponding to the risk profile associated with the software deployment.

12. The system of claim 9, wherein the at least one action of the modified set of actions in response to the update further configures the at least one processor to:
update a log entry or a tracking system;
update a metric in a monitoring system;
trigger an out-of-band activity;
interrupt a build process; or
generate a notification via at least one channel.

13. The system of claim 9, wherein determining the modified set of actions in response to the update is further based on an output of a machine-learning algorithm.

14. The system of claim 9, wherein the at least one parameter comprises at least one result of at least one type of security testing.

15. The system of claim 9, wherein the group of specified criteria comprises at least one of a requirement, a weighting value, a classification, a configuration option, a risk tolerance, or an accessibility level.

16. The system of claim 9, wherein the component manifest comprises a code repository, a vulnerability database, or a combination thereof.

17. A non-transitory computer-readable storage device storing instructions that, when executed by at least one processor, cause the at least one processor to perform operations comprising:
receiving a risk profile associated with a software deployment, and an update related to the software deployment, the update comprising a merge of code into a source-code repository;
evaluating at least one parameter associated with the update, to produce an evaluation result, the evaluation result comprising a determination that a risk associated with one or more components of the software deployment in isolation has increased as a result of the update;
determining a modified set of actions in response to the update, based at least in part on an initial set of actions, the evaluation result, a group of specified criteria on which the risk profile is based, and a component manifest corresponding to the software deployment, wherein the initial set of actions is associated with the one or more components of the software deployment in isolation, wherein the modified set of actions comprises at least one action not included in the initial set of actions, wherein the at least one action not included in the initial set of actions corresponds to the increased risk associated with the one or more components of the software deployment in isolation, and wherein the at least one action not included in the initial set of actions affects at least one additional component not included in the one or more components of the software deployment in isolation; and performing at least one action of the modified set of actions in response to the update.

18. The non-transitory computer-readable storage device of claim 17, wherein the update related to the software deployment comprises an update to at least one of the specified criteria corresponding to the risk profile associated with the software deployment.

19. The non-transitory computer-readable storage device of claim 18, the operations further comprising calculating an updated risk profile corresponding to the software deployment, based at least in part on the update to the at least one of the specified criteria corresponding to the risk profile associated with the software deployment.

20. The non-transitory computer-readable storage device of claim 17, wherein the at least one action of the modified set of actions in response to the update comprises:

updating a log entry or a tracking system;
updating a metric in a monitoring system;
triggering an out-of-band activity;
interrupting a build process; or
generating a notification via at least one channel.

* * * * *